United States Patent
Kanno

(10) Patent No.: US 8,305,615 B2
(45) Date of Patent: Nov. 6, 2012

(54) JOB PROCESSING METHOD FOR RESTARTING JOBS AFTER AN INTERRUPT

(75) Inventor: Shoichi Kanno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 12/436,674

(22) Filed: May 6, 2009

(65) Prior Publication Data

US 2009/0279136 A1 Nov. 12, 2009

(30) Foreign Application Priority Data

May 8, 2008 (JP) ................................ 2008-121986

(51) Int. Cl.
*G06F 3/12* (2006.01)
(52) U.S. Cl. .................... 358/1.15; 358/1.14; 358/1.16; 715/208; 715/234
(58) Field of Classification Search ................. None
See application file for complete search history.

(56) References Cited

U.S. PATENT DOCUMENTS

| | | | |
|---|---|---|---|
| 7,046,691 B1* | 5/2006 | Kadyk et al. ............... 370/466 |
| 2002/0159092 A1* | 10/2002 | Christodoulou et al. ..... 358/1.15 |
| 2003/0090697 A1* | 5/2003 | Lester et al. ............... 358/1.14 |
| 2005/0223309 A1* | 10/2005 | Lee et al. ................... 715/500.1 |
| 2006/0044593 A1 | 3/2006 | Kawakami et al. |
| 2006/0173998 A1* | 8/2006 | Ohara ........................ 709/224 |
| 2007/0050708 A1* | 3/2007 | Gupta et al. ................ 715/513 |
| 2008/0103860 A1* | 5/2008 | Hilerio et al. ............... 705/8 |
| 2008/0201485 A1* | 8/2008 | Patwardhan et al. ....... 709/238 |
| 2008/0278744 A1* | 11/2008 | Marchesotti et al. ....... 358/1.15 |
| 2009/0161147 A1* | 6/2009 | Klave ........................ 358/1.15 |
| 2010/0141978 A1* | 6/2010 | Nomura et al. ............ 358/1.14 |

FOREIGN PATENT DOCUMENTS

| | | | |
|---|---|---|---|
| JP | 09-311770 A | | 12/1997 |
| JP | 11-314438 A | | 11/1999 |
| JP | 2004126859 A | * | 4/2004 |
| JP | 2006-99725 A | | 4/2006 |
| JP | 2008-052457 A | | 3/2008 |

OTHER PUBLICATIONS

Wilen (Wictor Wilen, "Dissecting XPS—part 3—the Fixed Document", Jul. 12, 2007, downloaded from Internet Archive from URL: <http://web.archive.org/web/20070712211656/http://www.wictorwilen.se/Post/Dissecting-XPS--part-3--the-Fixed-Document.aspx>).*

* cited by examiner

*Primary Examiner* — King Poon
*Assistant Examiner* — David S Cammack
(74) *Attorney, Agent, or Firm* — Canon USA Inc. IP Division

(57) ABSTRACT

When an image forming apparatus executes printing based on a structured text including page entity information and a structure portion in which a link to the page entity information is set, the image forming apparatus corrects the structure portion of the structured text by deleting a link to a printed page entity if suspending the print of the structured text is instructed.

11 Claims, 31 Drawing Sheets

FIG.5

Document 501

```
<?xml version="1.0" encoding="utf-8"?>
<Documents xmlns="http://schemas.micxxxxxx.com/xps/2005/06">
<Print status="/Done"> ~511
</Print> ~512
<Print status="/None"> ~513
<PageContent Source="/Documents/1/Pages/1.fpage"/>
<PageContent Source="/Documents/1/Pages/2.fpage"/>
<PageContent Source="/Documents/1/Pages/3.fpage"/>
<PageContent Source="/Documents/1/Pages/4.fpage"/>
</Print> ~514
</Documents>
```

Document 502

```
<?xml version="1.0" encoding="utf-8"?>
<Documents xmlns="http://schemas.micxxxxxx.com/xps/2005/06">
<Print status="/Done"> ~521
<PageContent Source="/Documents/1/Pages/1.fpage"/>
<PageContent Source="/Documents/1/Pages/2.fpage"/>
</Print> ~522
<Print status="/None"> ~523
<PageContent Source="/Documents/1/Pages/3.fpage"/>
<PageContent Source="/Documents/1/Pages/4.fpage"/>
</Print> ~524
</Documents>
```

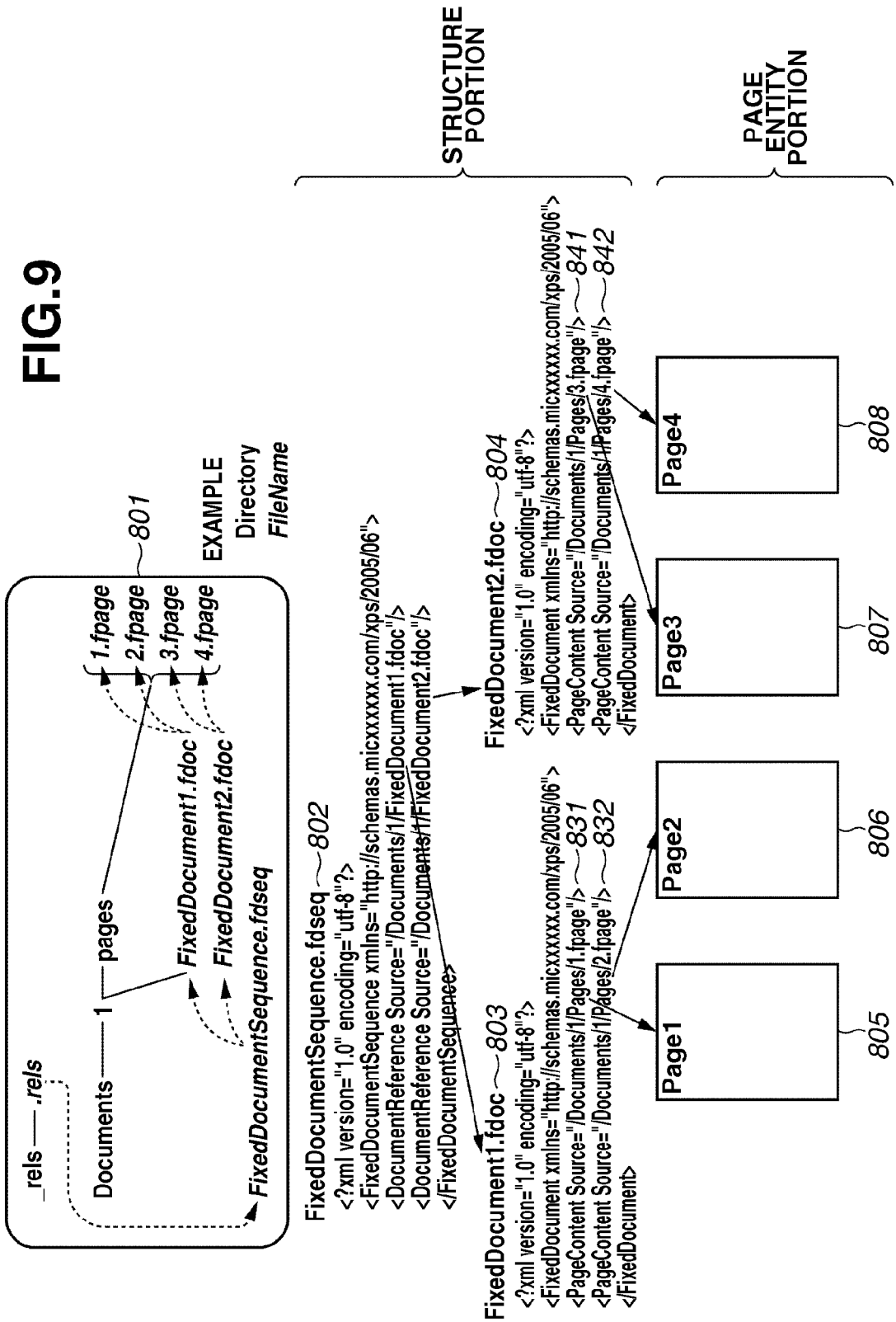

FIG.10

FixedDocument.fdoc     ⌐901

```
<?xml version="1.0" encoding="utf-8"?>
<!--This File is generated by XPS Document Writer--> ~911
<FixedDocument xmlns="http://schemas.micxxxxxx.com/xps/2005/06">
<!--C-LBP<PageContent Source="/Documents/1/Pages/1.fpage"/>--> ~912
<!--C-LBP<PageContent Source="/Documents/1/Pages/2.fpage"/>--> ~913
<PageContent Source="/Documents/1/Pages/3.fpage"/>
<PageContent Source="/Documents/1/Pages/4.fpage"/>
<PageContent Source="/Documents/1/Pages/5.fpage"/>
</FixedDocument>
```

FixedDocument.fdoc     ⌐902

```
<?xml version="1.0" encoding="utf-8"?>
<FixedDocument xmlns="http://schemas.micxxxxxx.com/xps/2005/06">
<!--<PageContent Source="/Documents/1/Pages/1.fpage"/>--> ~921
<!--<PageContent Source="/Documents/1/Pages/2.fpage"/>--> ~922
<PageContent Source="/Documents/1/Pages/3.fpage"/>
<PageContent Source="/Documents/1/Pages/4.fpage"/>
<PageContent Source="/Documents/1/Pages/5.fpage"/>
</FixedDocument>
```

FixedDocument.fdoc     ⌐903

```
<?xml version="1.0" encoding="utf-8"?>
<!--This File is generated by XPS Document Writer--> ~931
<FixedDocument xmlns="http://schemas.micxxxxxx.com/xps/2005/06">
<PageContent Source="/Documents/1/Pages/1.fpage"/>
<PageContent Source="/Documents/1/Pages/2.fpage"/>
<PageContent Source="/Documents/1/Pages/3.fpage"/>
<PageContent Source="/Documents/1/Pages/4.fpage"/>
<PageContent Source="/Documents/1/Pages/5.fpage"/>
</FixedDocument>
```

FixedDocument.fdoc     ⌐904

```
<?xml version="1.0" encoding="utf-8"?>
<FixedDocument xmlns="http://schemas.micxxxxxx.com/xps/2005/06">
<PageContent Source="/Documents/1/Pages/1.fpage"/>
<PageContent Source="/Documents/1/Pages/2.fpage"/>
<PageContent Source="/Documents/1/Pages/3.fpage"/>
<PageContent Source="/Documents/1/Pages/4.fpage"/>
<PageContent Source="/Documents/1/Pages/5.fpage"/>
</FixedDocument>
```

FIG.13

FixedDocument_add.fdoc  ~951

```
<?xml version="1.0" encoding="utf-8"?>
<!--This File is generated by XPS Document Writer--> ~955
<FixedDocument xmlns="http://schemas.micxxxxxx.com/xps/2005/06">
<PageContent Source="/Documents/1/Pages/3.fpage"/>
<PageContent Source="/Documents/1/Pages/4.fpage"/>
<PageContent Source="/Documents/1/Pages/5.fpage"/>
</FixedDocument>
```

FixedDocument_add.fdoc  ~952

```
<?xml version="1.0" encoding="utf-8"?>
<FixedDocument xmlns="http://schemas.micxxxxxx.com/xps/2005/06">
<PageContent Source="/Documents/1/Pages/3.fpage"/>
<PageContent Source="/Documents/1/Pages/4.fpage"/>
<PageContent Source="/Documents/1/Pages/5.fpage"/>
</FixedDocument>
```

FixedDocument.fdoc  ~953

```
<?xml version="1.0" encoding="utf-8"?>
<!--This File is generated by XPS Document Writer--> ~956
<FixedDocument xmlns="http://schemas.micxxxxxx.com/xps/2005/06">
<PageContent Source="/Documents/1/Pages/1.fpage"/>
<PageContent Source="/Documents/1/Pages/2.fpage"/>
<PageContent Source="/Documents/1/Pages/3.fpage"/>
<PageContent Source="/Documents/1/Pages/4.fpage"/>
<PageContent Source="/Documents/1/Pages/5.fpage"/>
</FixedDocument>
```

FixedDocument.fdoc  ~954

```
<?xml version="1.0" encoding="utf-8"?>
<FixedDocument xmlns="http://schemas.micxxxxxx.com/xps/2005/06">
<PageContent Source="/Documents/1/Pages/1.fpage"/>
<PageContent Source="/Documents/1/Pages/2.fpage"/>
<PageContent Source="/Documents/1/Pages/3.fpage"/>
<PageContent Source="/Documents/1/Pages/4.fpage"/>
<PageContent Source="/Documents/1/Pages/5.fpage"/>
</FixedDocument>
```

FIG.14

FixedDocumentSequence.fdseq      ╱―961

```
<?xml version="1.0" encoding="utf-8"?>
<!--This File is generated by XPS Document Writer-->  ～965
<FixedDocumentSequence xmlns="http://schemas.micxxxxxx.com/xps/2005/06">
<!--<DocumentReference Source="/Documents/1/FixedDocument.fdoc"/>-->  ～966
<DocumentReference Source="/Documents/1/FixedDocument_add.fdoc"/>  ～967
</FixedDocumentSequence>
```

FixedDocumentSequence.fdseq      ╱―962

```
<?xml version="1.0" encoding="utf-8"?>
<FixedDocumentSequence xmlns="http://schemas.micxxxxxx.com/xps/2005/06">
<!--<DocumentReference Source="/Documents/1/FixedDocument.fdoc"/>-->  ～968
<DocumentReference Source="/Documents/1/FixedDocument_add.fdoc"/>  ～969
</FixedDocumentSequence>
```

FixedDocumentSequence.fdseq      ╱―963

```
<?xml version="1.0" encoding="utf-8"?>
<!--This File is generated by XPS Document Writer-->  ～970
<FixedDocumentSequence xmlns="http://schemas.micxxxxxx.com/xps/2005/06">
<DocumentReference Source="/Documents/1/FixedDocument.fdoc"/>
</FixedDocumentSequence>
```

FixedDocumentSequence.fdseq      ╱―964

```
<?xml version="1.0" encoding="utf-8"?>
<FixedDocumentSequence xmlns="http://schemas.micxxxxxx.com/xps/2005/06">
<DocumentReference Source="/Documents/1/FixedDocument.fdoc"/>
</FixedDocumentSequence>
```

| PRINT RESTART |
|---|

PLEASE SELECT ACTION FOR PRINT SUSPENDED JOB.

JOB NAME:    Test Data

STATUS:    2/5 PAGE COMPLETED

ACTION:    [ CONTINUED PRINT ] *1502*  [ FULL-ITEM REPRINT ] *1503*

OUTPUT DESTINATION:    [ PRESENT DEVICE ]  [ ANOTHER DEVICE ]  [ MEMORY CARD ]

*1504*    *1505*    *1506*

[ BACK ]    [ OK ]

JOB PRINT

PRINT OF ALL ITEMS IS REQUIRED.

JOB NAME: Test Data

STATUS: 2/5 PAGE COMPLETED

REASON: PRESENCE OF STAPLE DESIGNATION

ACTION: [CONTINUED PRINT] [FULL-ITEM REPRINT]

[BACK] [OK]

FIG.28

JOB PRINT

THERE IS SETTING TO BE CHANGED. PLEASE SELECT ACTION FOR IT.

JOB NAME: Test Data

STATUS: 2/5 PAGE COMPLETED

SHEET SIZE: A3 → | A4 | ▲
| LTR |
| | ▼

METHOD: TWO-SIDED → ONE-SIDED

BACK    OK

FIG.30

JOB RECEPTION

SUSPENDED JOB IS RECEIVED.
PLEASE SELECT ACTION FOR IT.

- JOB NAME: Test Data
- STATUS: 2/5 PAGE COMPLETED
- ACTION: [CONTINUED PRINT] [FULL-ITEM REPRINT]

[BACK] [OK]

FIG.31

FD/CD-ROM OR COMPARABLE STORAGE MEDIUM

| DIRECTORY INFORMATION |
|---|
| FIRST PROCESSING PROGRAM<br>PROGRAM CODE GROUP CORRESPONDING TO<br>STEPS OF FLOWCHART ILLUSTRATED IN FIG. 6 |
| SECOND PROCESSING PROGRAM<br>PROGRAM CODE GROUP CORRESPONDING TO<br>STEPS OF FLOWCHART ILLUSTRATED IN FIG. 7 |
| THIRD PROCESSING PROGRAM<br>PROGRAM CODE GROUP CORRESPONDING TO<br>STEPS OF FLOWCHART ILLUSTRATED IN FIG. 11 |
| FOURTH PROCESSING PROGRAM<br>PROGRAM CODE GROUP CORRESPONDING TO<br>STEPS OF FLOWCHART ILLUSTRATED IN FIG. 12 |
| FIFTH PROCESSING PROGRAM<br>PROGRAM CODE GROUP CORRESPONDING TO<br>STEPS OF FLOWCHART ILLUSTRATED IN FIG. 16 |
| SIXTH PROCESSING PROGRAM<br>PROGRAM CODE GROUP CORRESPONDING TO<br>STEPS OF FLOWCHART ILLUSTRATED IN FIG. 17 |
| SEVENTH PROCESSING PROGRAM<br>PROGRAM CODE GROUP CORRESPONDING TO<br>STEPS OF FLOWCHART ILLUSTRATED IN FIG. 18 |
| EIGHTH PROCESSING PROGRAM<br>PROGRAM CODE GROUP CORRESPONDING TO<br>STEPS OF FLOWCHART ILLUSTRATED IN FIG. 19 |
| NINTH PROCESSING PROGRAM<br>PROGRAM CODE GROUP CORRESPONDING TO<br>STEPS OF FLOWCHART ILLUSTRATED IN FIG. 27 |
| TENTH PROCESSING PROGRAM<br>PROGRAM CODE GROUP CORRESPONDING TO<br>STEPS OF FLOWCHART ILLUSTRATED IN FIG. 29 |

MEMORY MAP OF STORAGE MEDIUM

JOB PROCESSING METHOD FOR RESTARTING JOBS AFTER AN INTERRUPT

BACKGROUND OF THE INVENTION

1. Field of the Invention

The present invention relates to an image forming apparatus that processes a job acquired from an information processing apparatus.

2. Description of the Related Art

In a conventional printing system, an information processing apparatus and an image forming apparatus communicate with each other to process a job. The printing system may suspend a print job, for example, due to occurrence of an error or in response to an interruption by another job, and may later restart the suspended print processing. In this case, as discussed in Japanese Patent Application Laid-Open No. 2006-99725, a conventional system manages two pieces of information (i.e., suspended job information and print-finished region information) to control the print processing so as to resume from a breakpoint or restart from the beginning.

In this case, a device that may suspend print processing (including a server in the case of "pull printing") is generally required to specify a resumption or a reprint of the print job.

Moreover, regarding a print job that may not be independent for each page (e.g., PDF or PDL), it is difficult to control the switching between two options. Therefore, the job suspended device is required to perform the remaining processing based on intermediate data.

If the print job is transferred to another device, for example, due to job archive in a suspended state or in response to interrupt processing, the print suspending device may not execute the print processing. In this case, a job receiver side cannot control the print processing according to a solution or a situation so as to resume the print from a breakpoint or restart the print from the beginning.

According to the above-described conventional printing system, when a job is suspended or when the suspended job is transferred to another device, it is difficult to appropriately determine whether to resume the suspended job from a breakpoint or restart the print from the beginning.

The job receiver side may not be able to perform a print of a transferred job if the solution of a printing machine cannot accept the job. Moreover, whether the print suspending device or the job receiver side attempts to start the job for the purpose of resuming the job once suspended by the different device, it is difficult to execute a continued print (which resumes from a breakpoint) and a full-item reprint (which starts from the beginning).

SUMMARY OF THE INVENTION

Exemplary embodiments of the present invention are directed to a system capable of correcting a structure of a suspended print job to enable users to instruct either a continued print or a full-item reprint.

According to an aspect of the present invention, an image forming apparatus performs print processing on a job acquired from an information processing apparatus. The image forming apparatus includes a correction unit configured to correct header information of a job having a structured text format according to a suspended state of print processing of the job, and a holding unit configured to hold the job whose header information is corrected by the correction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5 illustrates an example of a page link disabled by correcting an example document illustrated in FIG. 4.

FIG. 9 illustrates an internal structure of a text that may be processed by the image forming apparatus according to an exemplary embodiment.

FIG. 10 illustrates examples of FixedDocument.fdoc based on XML Paper Specification (XPS) illustrated in FIGS. 8 and 9.

FIG. 13 illustrates examples of FixedDocument.fdoc based on the XPS that may be processed by the image forming apparatus according to an exemplary embodiment.

FIG. 14 illustrates examples of FixedDocumentSequence.fdseq based on the XPS that may be processed by the image forming apparatus according to an exemplary embodiment.

FIG. 22 illustrates an example of a user interface that can be displayed on the operation unit illustrated in FIG. 1.

FIG. 26 illustrates an example of a user interface that can be displayed on the operation unit illustrated in FIG. 1.

FIG. 28 illustrates an example of a user interface that can be displayed on the operation unit illustrated in FIG. 1.

FIG. 30 illustrates an example of a user interface that can be displayed on the operation unit illustrated in FIG. 1.

FIG. 31 illustrates a memory map of a storage medium that stores various data processing programs readable by the image forming apparatus according to the present invention.

DETAILED DESCRIPTION OF THE EMBODIMENTS

Figure 1:
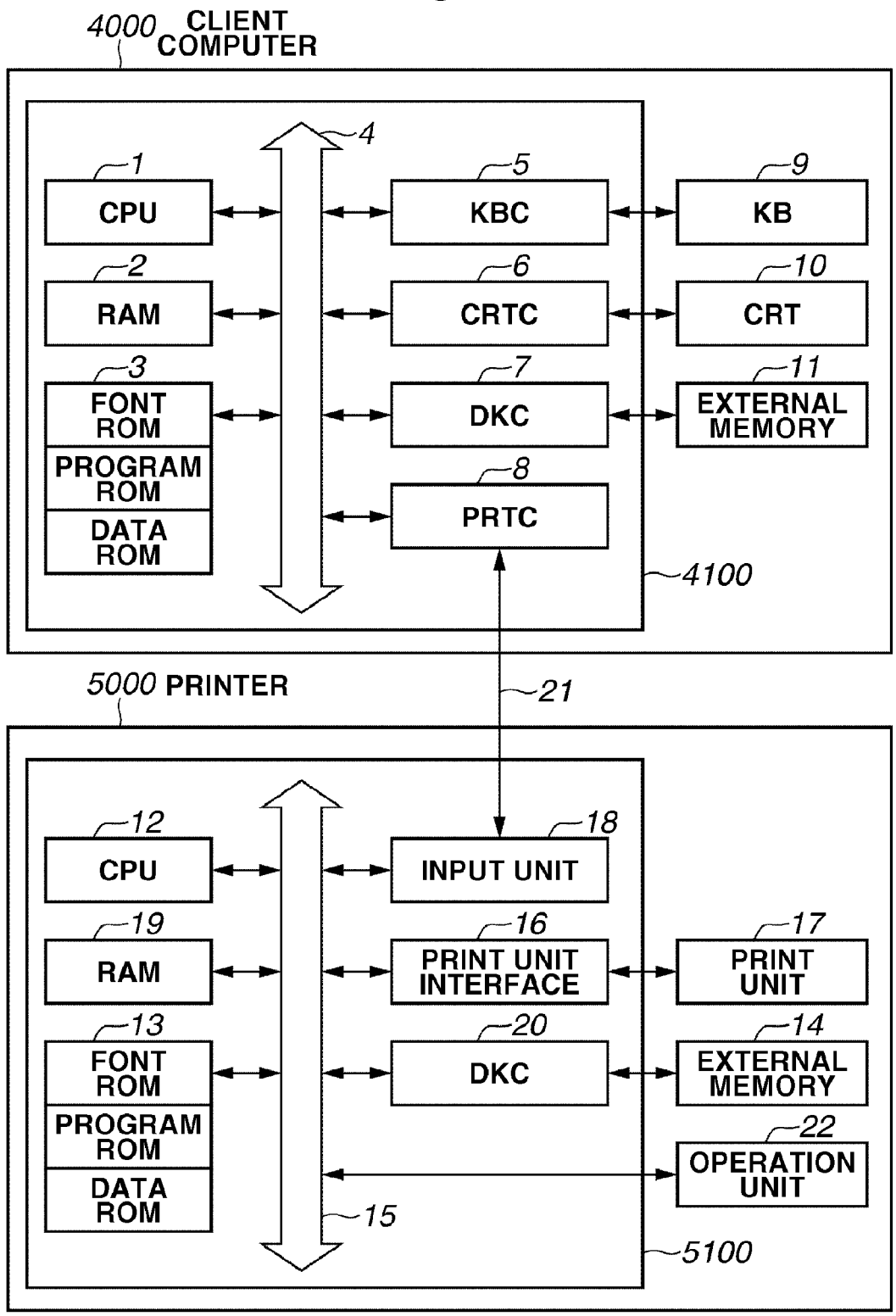
FIG. 1 is a block diagram illustrating an example of a printing system according to an exemplary embodiment.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Various exemplary embodiments, features, and aspects of the invention will be described in detail below with reference to the drawings.

FIG. 1 is a block diagram illustrating an example of a printing system according to an exemplary embodiment. The present invention may be applicable to any devices capable of realizing functions of the present invention, such as a single device, an integrated system including a plurality of devices, or a processing system accessible via a network (e.g., local area network (LAN) or wide area network (WAN)). The present printing system includes an information processing apparatus and an image forming apparatus that can perform bidirectional communications via, for example, a network or a bidirectional communication interface.

In the present exemplary embodiment, an example of the image forming apparatus may be a printer. Another example of the image forming apparatus may be, for example, a multi function peripheral (MFP) having a print function or a facsimile apparatus. The image forming apparatus may acquire a job from the information processing apparatus and may perform various processing on the job. For example, the processing performed by the image forming apparatus may include processing for determining whether the received job is a structured text, and processing for converting the job into a structured text and also correcting the converted structured text based on the determination processing. For example, in a situation where at least one print-finished page is present, the image forming apparatus may restart the print processing according to a suspended state of the job.

In FIG. 1, a client computer 4000 includes a central processing unit 1 (i.e., CPU) that may execute document processing on various documents including graphics, images, characters, and tables (including spread sheets) based on a document processing program stored in a read only memory 3 (i.e., ROM), more specifically in a program ROM, or an external memory 11. The CPU 1 may control operations of various devices connected to a system bus 4.

The program ROM of the ROM 3, or the external memory 11, may store an operating system (hereinafter, referred to "OS") that serves as a control program for the CPU 1. A font ROM of the ROM 3, or the external memory 11, may store font data that can be used in the document processing. A data ROM of the ROM 3, or the external memory 11, may store various data that can be used in the document processing. A printer driver, which is capable of generating print information that may be output to the printer, can be installed on the external memory 11 according to a print request from an application.

The printer driver according to the present exemplary embodiment has a function for outputting a structured job having an XML Paper Specification (i.e., XPS) format to the printer. An application can be configured to have a function for outputting a structured job to the printer.

A random access memory 2 (i.e., RAM) can function as a main memory or a work area for the CPU 1. A keyboard I/F 5 (i.e., KBC) may control various key input operations via a keyboard 9 (i.e., KB) or other pointing devices (not illustrated).

A display I/F 6 (i.e., CRTC) may control the display that can be performed by a display device 10 (i.e., CRT). An external memory I/F 7 (i.e., DKC) may control each access to the external memory 11, such as a hard disk (i.e., HD) or a flexible disk (i.e., FD). The external memory 11 may store a boot program, various applications, font data, user files, editing files, and printer drivers.

A printer I/F 8 (i.e., PRTC) may be connected to a printer 5000 via a predetermined bidirectional interface 21 and may execute processing for controlling communications between the client computer 4000 and the printer 5000.

The CPU 1 may execute processing for rasterizing outline fonts to a display information RAM, which can be set in the RAM 2, and may enable WYSIWYG on the display 10.

The CPU 1 may open various windows, which may be registered beforehand, in response to a user's operation that instructs a command with a mouse cursor (not illustrated) on the CRT 10 to execute various data processing. For example, to perform a print of a document, a user may open a window relating to print settings and may perform printer settings and printer driver settings (such as, determination of a print processing method including selection of a print mode).

The printer 5000 includes a printer CPU 12 that may output an image signal, as output information, to a print unit 17, such as a printer engine, which is connected to a system bus 15, based on the control program stored in the program ROM of the ROM 13 or the control program stored in the external memory 14. The printer 5000 executes processing described in the following flowcharts to receive a job that has a structured text format from the client computer 4000 and process the job. For example, the printer 5000 can execute a job having an XML Paper Specification (i.e., XPS) format. However, the structured text format that may be processed by the printer 5000 is not limited to the XPS format. If the job received from the client computer 4000 is not a structured text format, the CPU 12 converts the job structure into a structured text format and stores the converted job in the external memory 14. More specifically, the printer 5000 can convert a suspended job into a format that can be easily processed by the printer 5000 itself before the printer 5000 restarts the print processing.

Therefore, even if the received print job is a job (e.g., PDF or PDL) that may not be independent for each page, the printer 5000 can execute job processing for restarting the print of a suspended job based on its determination. When the printer 5000 restarts the print processing, the printer 5000 can perform either a continued print or a full-item reprint as described below. The full-item reprint may be usable to restart the print processing from the beginning to print all pages of a print job. The continued print may be usable to resume the print processing from a breakpoint to print the rest of the print job.

The program ROM of the ROM 13 may store the control program for the CPU 12. A font ROM of the ROM 13 may store font data that can be used when the above-described output information is generated. A data ROM of the ROM 13 may store information that can be used by the client computer 4000 if the external memory 14 (e.g., a hard disk) is not included in the printer 5000.

The CPU 12 can communicate with the client computer 4000 via the input unit 18 to transmit the information from the printer 5000 to the client computer 4000.

A random access memory (i.e., RAM) 19 may function as a main memory or a work area of the CPU 12. An optional RAM can be connected to an add-in port (not illustrated) of the RAM 19 to expand the total memory capacity.

The RAM 19 can be used as an output information rasterizing area, an environmental data storing area, or a nonvolatile RAM (i.e., NVRAM). A memory controller 20 (i.e., DKC) may control the access to the external memory 14, such as a hard disk (i.e., HD) or an IC card. A print unit interface 16 may control the print unit 17.

The external memory 14, which may be connected as an optional device, can store font data, emulation program, and form data. An operation unit 22 can include switches that enable users to set print functions and a light-emitting diode (i.e., LED) display device that displays a status of an operation. The operation unit 22 can be configured as a touch panel that may include a large-size liquid crystal display device. The above-described external memory 14 is not limited to a single memory and therefore may include two or more memories. For example, two or more memories can be connected with each other to constitute the external memory 14 to store, in addition to built-in fonts, interpretation programs that can interpret option font cards and various types of printer control languages.

The external memory 14 can also be configured to copy and store the data stored in the RAM 19 (i.e., a built-in storage device in the printer 5000). The external memory 14 can also include an NVRAM (not illustrated) to store printer mode setting information supplied from the operation unit 22.

Figure 2:
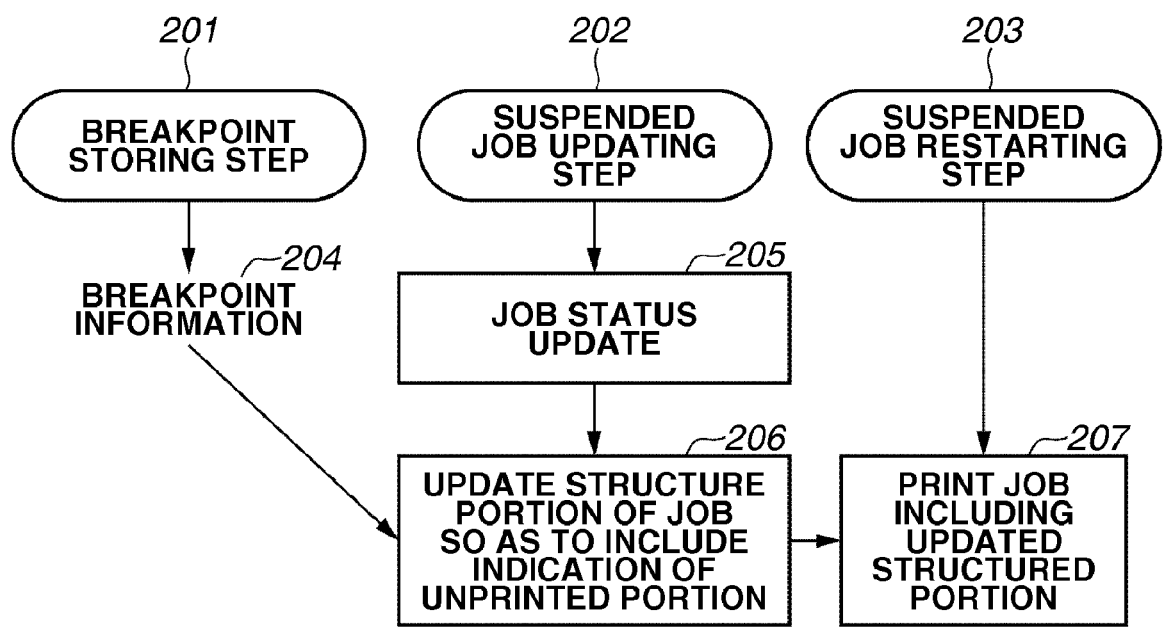
FIG. 2 illustrates job interrupt processing performed by an image forming apparatus according to an exemplary embodiment.

FIG. 2 illustrates job interrupt processing performed by the image forming apparatus according to an exemplary embodiment. Example job interrupt processing is described below with reference to an example job status and an example structured document illustrated in FIG. 3.

In FIG. 2, a breakpoint storing step 201 is a step of storing a breakpoint of a print job in the RAM 19 of the printer 5000 if the printer 5000 suspends the print job due to occurrence of an error or in response to an interrupt caused by a succeeding job having a higher priority.

Figure 3:
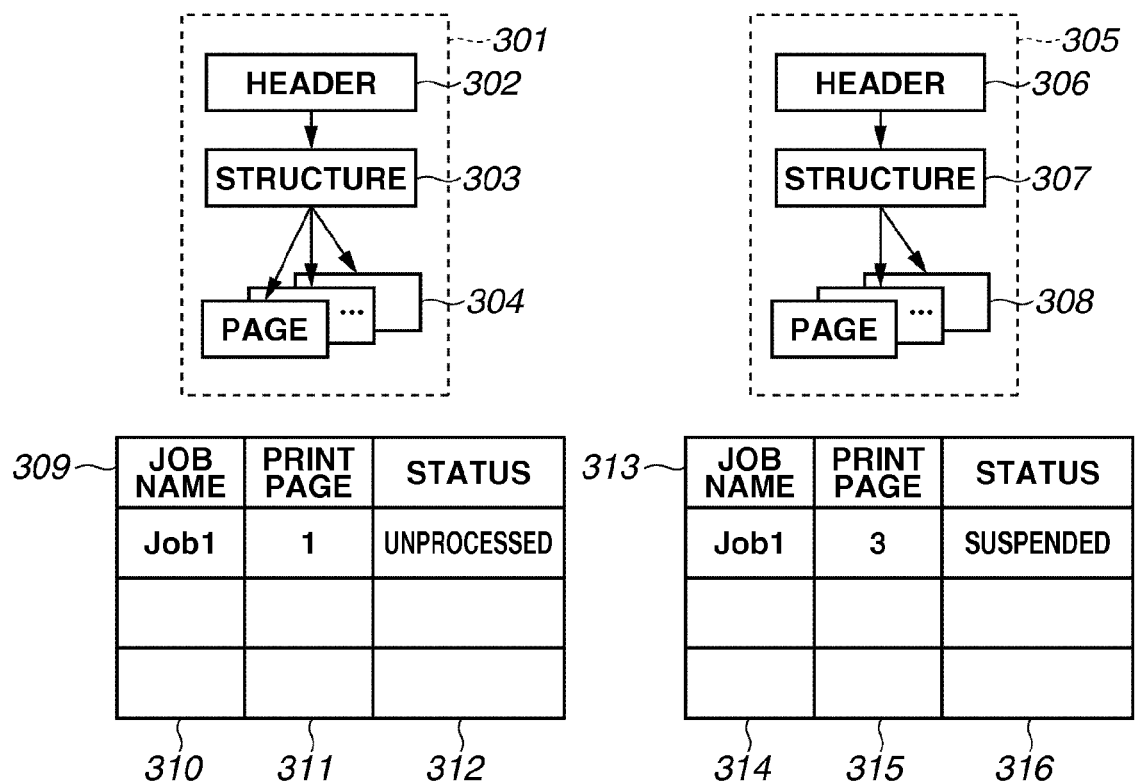
FIG. 3 illustrates a job that may be processed by the image forming apparatus according to an exemplary embodiment and its status.

A job state 309 illustrated in FIG. 3 indicates job management information at the job input timing. The job management information, which includes items 310 to 312, can be managed on the RAM 19 of the printer 5000. The job name 310 is Job 1. The print page (i.e., a page that maybe printed next) 311 is the first page. The status 312 is "unprinted." Needless to say, other information can be managed as part of the job management information. The page that may be printed next is indicated, as breakpoint information 204 illustrated in FIG. 2, by the print page 311 and the status 312. The breakpoint information 204 illustrated in FIG. 2 can be managed on the RAM 19.

A job state 313 illustrated in FIG. 3 indicates job management information at the time when the job is suspended after the print of the second page is completed. The job state 313 of the job management information, which includes items 314 to 316, is a transition from the job state 309 illustrated in FIG. 3. The job name 314 is Job 1. The print page (i.e., a page that may be printed next) 315 is the third page. The status 316 is "suspended."

A suspended job updating step 202 illustrated in FIG. 2 is a step of correcting a structure portion of the suspended job having a structured data format and storing the suspended page position in the job.

FIG. 2 illustrates a job status update process 205 for changing the job status 312 illustrated in FIG. 3 to the job status 316 illustrated in FIG. 3. FIG. 3 illustrates header portions 302 and 306 and structure portions 303 and 307. According to the structured text in the present exemplary embodiment, the structure portions 303 and 307 include setting of links to page entity portions 304 and 308. In the present exemplary embodiment, the header portion and the structure portion are collectively referred to as header information. Information of each page constituting the page entity portion is referred to as page entity information.

FIG. 2 illustrates a process of updating the job structure portion of the job so as to include an indication of an unprinted portion 206, according to which the job is converted into a job that instructs resuming the print processing from a breakpoint by correcting the link in the structure portion of the job having a structured data format while leaving the page entity portion unchanged. In FIG. 3, a job 301 illustrates a job state at the job input timing, while a job 305 illustrates a job state of the suspended job.

In the job 301, the structure portion 303 is linked to all pages of the page entity portion 304. On the other hand, in the job 305 (i.e., a state shifted from the job 301), the structure portion 307 is linked only to print-finished pages of the page entity portion 308.

However, the print-finished page entities are left unchanged. In this manner, the breakpoint information can be embedded into the data by rearranging the page links in the structure portion so as to indicate a page where the print is suspended and subsequent pages.

A suspended job restarting step 203 illustrated in FIG. 2 is a step of restarting the suspended print job. In a process of printing a job including the updated structure portion 207, the structured job having the structure portion corrected to indicate a region starting from the breakpoint is printed.

As the job itself stores information indicating the print start point (a page from which the print may start), a reprint of the job can be performed in the same manner as a new job to perform printing of the region starting from the breakpoint.

Figure 4:
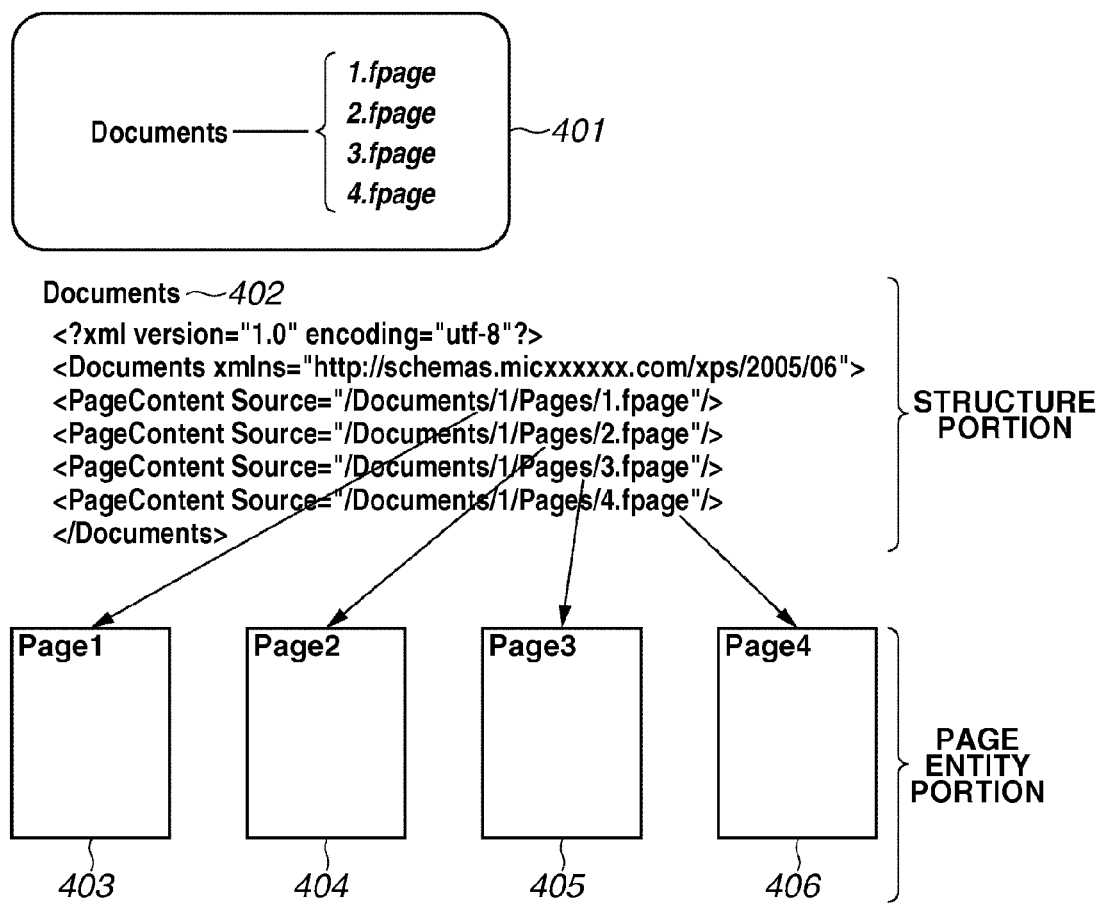
FIG. 4 illustrates an example of a job structure that may be processed by the image forming apparatus according to an exemplary embodiment.

FIG. 4 illustrates an example structure of a job that may be processed by the image forming apparatus according to an exemplary embodiment.

FIG. 4 illustrates a general structured job 401 that includes a structure portion "Documents" and a plurality of page entity portions "n.fpage", wherein "n" indicates the page number that may be successively increased. In the present exemplary embodiment, the job is constituted by a structured text that includes the page link connecting a structure portion to each page entity portion. In another exemplary embodiment, the job may be a structured text that is not illustrated in FIG. 4.

The structure portion (i.e., "Documents") 402 is an example text having an XML format, although the format is not limited to the XML format.

The line starting with "PageContent Source" is a link to each page entity. Each of 1.fpage to 4.fpage indicates a file that stores the page entity. FIG. 4 illustrates a document including four pages 403, 404, 405, and 406, which is expressed in a structured text.

FIG. 5 illustrates an example cutting of the page link realized by correcting the "Document" illustrated in FIG. 4.

FIG. 5 illustrates examples of documents 501 and 502, in which the document 502 includes a unique tag added to cut the page link.

A tag 511 of <Print status="/Done"> is paired with a tag 512 of </Print>. A tag 513 of <Print status="None"> is paired with a tag 514 of </Print>.

Each "PageContent Source" line between a tag 521 and a tag 522, indicates a print-finished page link. Each "PageContent Source" line between a tag 523 and a tag 524, indicates an unprinted page link.

The document 501 is an example of an unprinted document. On the other hand, the document 502 includes two "PageContent Source" lines linked to 1.fpage and 2.fpage, between the tag 521 of <Print status="/Done"> and the tag 522 of </Print>. Therefore, the document 502 is a partly print-finished document, as to which the print of the first and second pages is already completed.

The document 502 further includes two "PageContent Source" lines linked to 3.fpage and 4.fpage, between the tag 523 of <Print status="/None">and the tag 524 of </Print>. Therefore, the document 502 is a partly print-finished document, as to which the print of the third and fourth pages is not finished.

The document 402 illustrated in FIG. 4 is equivalent to the document 501 illustrated in FIG. 5 in that all pages are linked.

In the example illustrated in FIG. 4, if the document 402 is replaced with the document 502 and the document 401 is generated, the data that may be printed is only the third and fourth pages.

On the other hand, if the document 402 is replaced with the document 501 and the document 401 is generated, the data that may be printed includes all pages. In the present exemplary embodiment, in any case, the page entity portions 403 to 406 are left unchanged and only the structure portion is modified.

Figure 6:
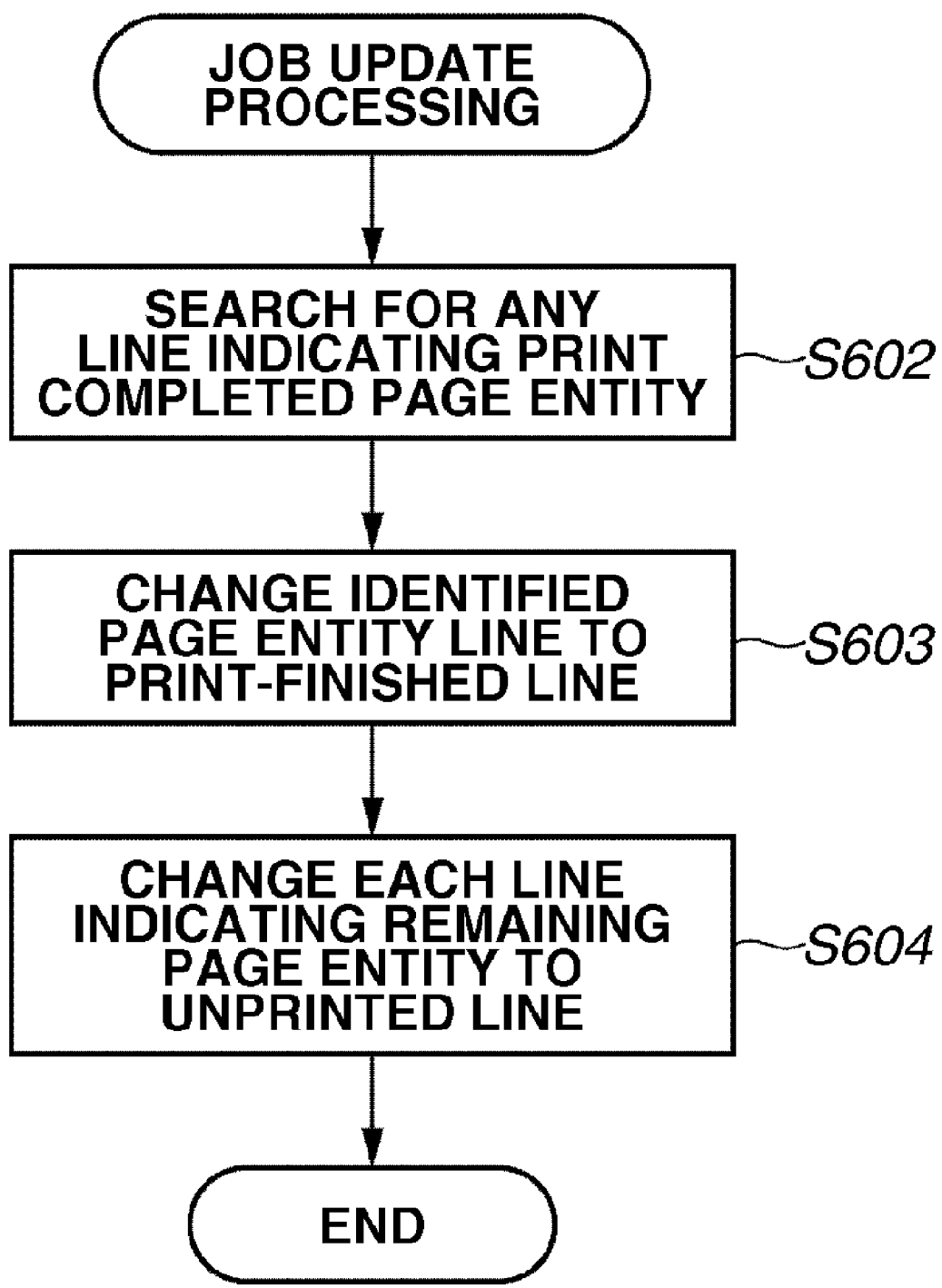
FIG. 6 is a flowchart illustrating an example procedure of data processing that can be performed by the image forming apparatus according to an exemplary embodiment.

FIG. 6 is a flowchart illustrating an example procedure of data processing that can be performed by the image forming apparatus according to an exemplary embodiment. The data processing illustrated in FIG. 6 corresponds to the document correction processing illustrated in FIG. 5. The CPU 12 executes the program corresponding to respective steps of FIG. 6, which may be loaded from the ROM 13 to the RAM 19. As another method, the program can be stored in the external memory 14 and can be loaded to the RAM 19.

If the Job update processing (i.e., document update processing) starts, then in step S602, the CPU 12 searches for any line indicating print completed page entity. More specifically, if the job update processing starts at the time when the print of the first and second pages is already completed, the CPU 12 searches for the line including the link to the first page and the line including the link to the second page.

As each page entity is expressed in the form of "n.fpage" (where "n" represents the page number), the CPU 12 searches for the line including the link to 1.fpage and the line including the link to 2.fpage.

Next, in step S603, the CPU 12 changes each line indicating the page entity identified in step S602 to a print-finished line. More specifically, in the document 502 illustrated in FIG. 5, the CPU 12 puts the tag 521 of <Print status="/Done"> and the tag 522 of </Print> so as to encompass the link lines to 1.fpage and 2.fpage between them.

In step S604, the CPU 12 changes each line indicating the remaining page entity to an unprinted line. More specifically, the CPU 12 puts the tag 523 of <Print status="/None"> and the tag 524 of </Print> so as to encompass the link lines including 3.fpage and 4.fpage.

Then, the CPU 12 terminates the processing of this routine.

Through the above-described processing, the CPU 12 can generate the document 502 illustrated in FIG. 5. Thus, the CPU 12 can restart the suspended job that is in a state where the print-finished pages are excluded.

Figure 7:
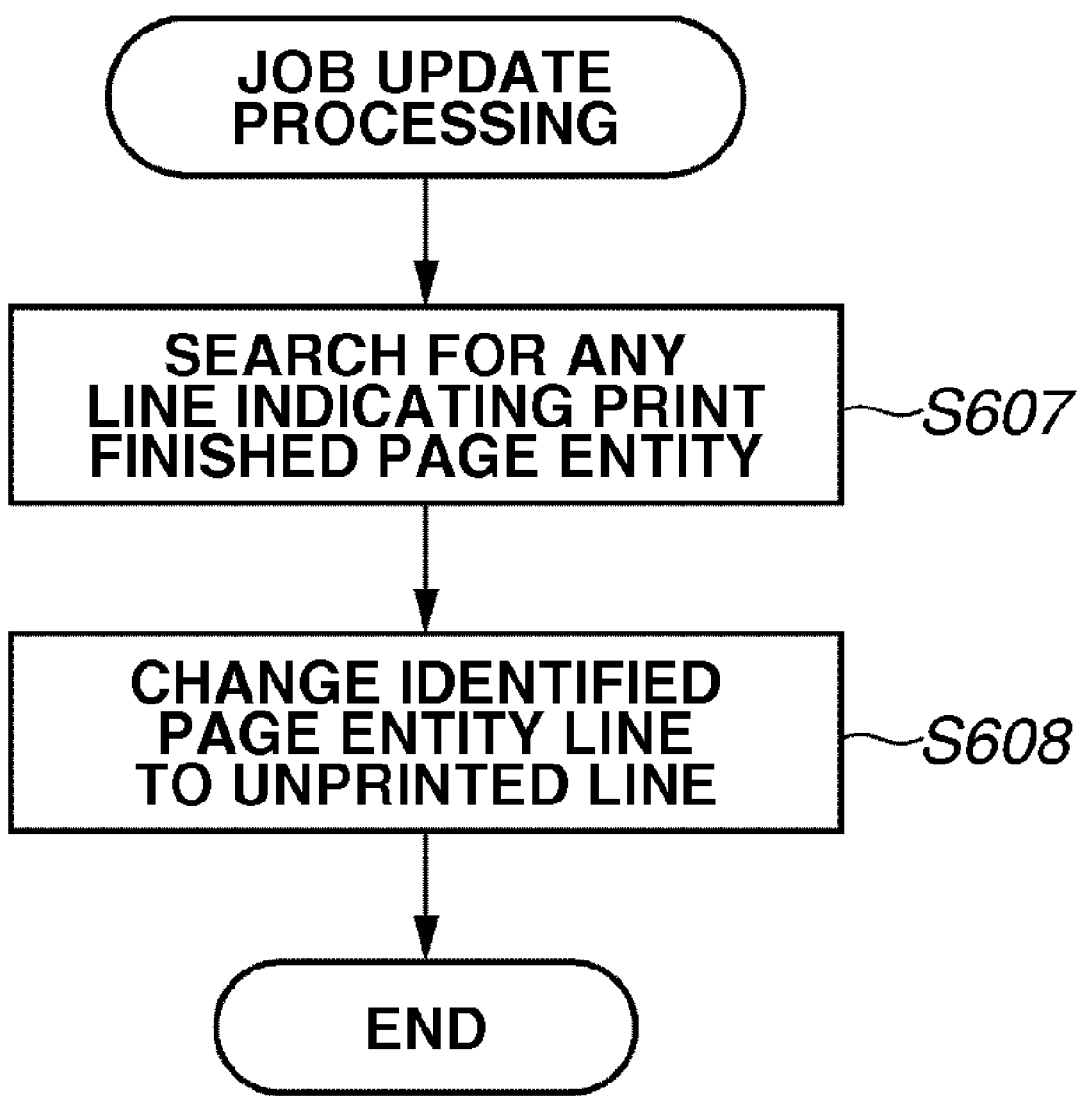
FIG. 7 is a flowchart illustrating an example procedure of data processing that can be performed by the image forming apparatus according to an exemplary embodiment.

FIG. 7 is a flowchart illustrating an example procedure of data processing that can be performed by the image forming apparatus according to an exemplary embodiment. The data processing illustrated in FIG. 7 corresponds to restoring processing for changing the document having a document 502 format to the document having a document 501 format. The CPU 12 executes the program corresponding to respective steps of FIG. 7, which may be loaded from the ROM 13 to the RAM 19. As another method, the program can be stored in the external memory 14 and can be loaded to the RAM 19.

First, in step S607, the CPU 12 searches for a line indicating a print-finished page entity. More specifically, the CPU 12 searches the document 502 for a pair of <Print status="/Done"> and </Print>. Next, in step S608, the CPU 12 changes the identified line indicating the page entity to the unprinted line, and terminates the processing of this routine. In this manner, the CPU 12 can change the job state from the "Done" state to the "None" state not subjected to the correction.

More specifically, the CPU 12 does not put any line indicating the page link between the paired lines of <Print status="/Done"> and </Print> so that all lines indicating the page link are disposed between the paired lines of <Print status="/None"> and </Print>. Through this operation, the CPU 12 can restore the document 502 to the document 501. More specifically, through the processing of changing the document 502 to the document 501, the CPU 12 can restore the job state preceding the break of print processing and can restart the suspended job.

According to the example illustrated in FIG. 4, the document (i.e., "Documents") 402 constituting the structure portion is an XML text. In FIG. 5, the line indicating an unprinted state or a print-finished state is an XML tag dedicated to the present invention. However, as described above, the structure portion is not limited to the XML.

Accordingly, a method indicating "unprinted" and "print-finished" is not limited to the above-described method. Therefore, another exemplary embodiment of the present invention may employ an optimum method according to the format of the structure portion. As described above, the exemplary embodiment can convert a structured text that includes a page link connecting a structure portion to a page entity portion into a structured text that instructs printing only the unprinted portion by disabling the link to a print-finished page by correcting the structure portion. According to the present exemplary embodiment, the page entity portion is left unchanged. Therefore, the structured text can be simply changed to the original structured text that instructs a complete print of all pages by restoring the page link to the original one.

Moreover, the above-described system is characteristic in that the structured text itself includes information indicating each print-finished page and, therefore, does not require any other system.

Figure 8:
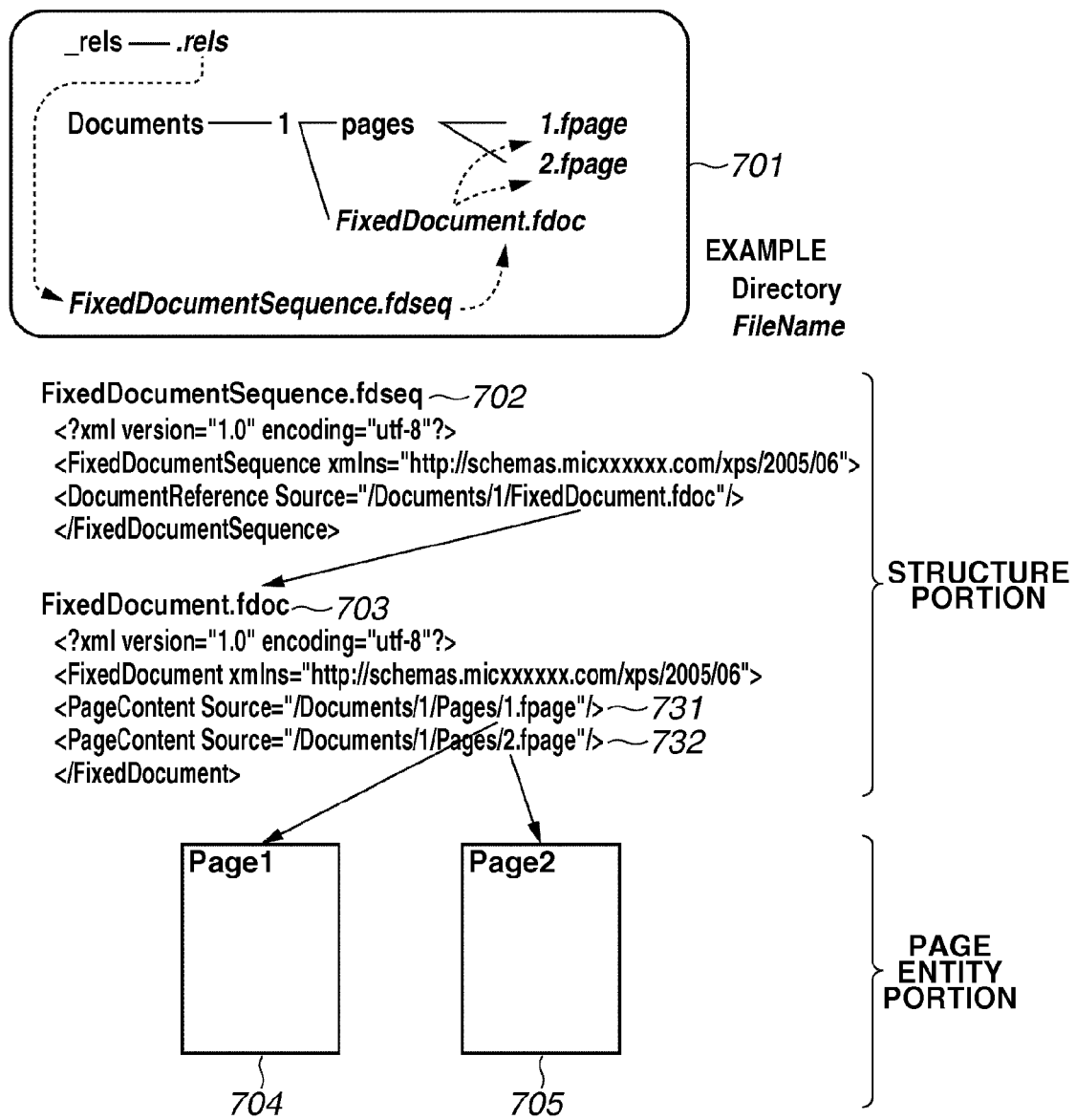
FIG. 8 illustrates an internal structure of a text that may be processed by the image forming apparatus according to an exemplary embodiment.

FIG. 8 illustrates an internal structure of a structured text that may be processed by the image forming apparatus according to a second exemplary embodiment.

In FIG. 8, a structured job 701 is an example of XPS, which is defined by Microsoft Corporation.

According to the structure of the XML Paper Specification (i.e., XPS), ".rels" links with FixedDocumentSequence.fdseq, which links with FixedDocument.fdoc, which links with n.fpage (i.e., page entity portion). FIG. 8 illustrates an example 702 of FixedDocumentSequence.fdseq, which links with an example of FixedDocument.fdoc 703, which includes a tag 731 and a tag 732. The tag 731 and a tag 732 link to page entities 704 and 705.

The page entities 704 and 705 are, for example, constituted by texts and JPEG files.

FIG. 9 illustrates an internal structure of a structured text that may be processed by the image forming apparatus according to the second exemplary embodiment. In FIG. 9, an example structured job 801 is another example of the XPS. The XPS may have a structure portion that is variable depending on the application that creates the XPS. The example illustrated in FIG. 9 includes two or more pieces of FixedDocument.fdoc. FIG. 9 illustrates an example 802 of FixedDocumentSequence.fdseq, which links with examples 803 and 804 of FixedDocument.fdoc, which include a tag 831, a tag 832, a tag 841, and a tag 842 that link to page entities 805 to 808.

The page entities 805 to 808 are, for example, constituted by texts and JPEG files.

FIG. 10 illustrates examples of FixedDocument.fdoc based on the XPS illustrated in FIGS. 8 and 9. The example illustrated in FIG. 10 is an example correction for disabling the page link to a print-finished page. According to this example, the first and second pages are in a print-finished state in the document that includes five pages.

The FixedDocument.fdoc, at the time immediately after an XPS text is generated by an application or a printer driver of the client computer 4000, has a format of FixedDocument.fdoc 903 or FixedDocument.fdoc 904 illustrated in FIG. 10.

Compared to the FixedDocument.fdoc 904, the FixedDocument.fdoc 903 includes a tag 931 indicating a comment line that may be added by the XPS text creator (i.e., a driver or an application).

The FixedDocument.fdoc 904 does not include any comment generated by the driver or the application.

As FixedDocument.fdoc 902 illustrated in FIG. 10 includes the first and second pages in the print-finished, the links to the first and second pages are and separated with tags 921 and 922. The FixedDocument.fdoc 902 is resultant from the FixedDocument.fdoc 904 when the FixedDocument.fdoc 904 is corrected. The comments existing in the FixedDocument.fdoc 902 are the tags 921 and 922 that disable the page links. As FixedDocument.fdoc 901 illustrated in FIG. 10 includes the first and second pages in the print-finished state, the links to the first and second pages are commented and separated with tags 912 and 913. The FixedDocument.fdoc 901 is resultant from the FixedDocument.fdoc 903 when the FixedDocument.fdoc 903 is corrected.

Each comment of the tags 912 and 913 includes a character string "C-LBP" added to the head of each comment of the tags 912 and 913. The character string "C-LBP" indicates that the comment is added according to the present exemplary embodiment. Therefore, the comment of a tag 911 added by the application can be discriminated from the tag 912 and the tag 913. The character string "C-LBP" is a mere example and can be replaced with other character string. In the exemplary embodiment, C-LBP is a comment that can be discriminated from the comment added by the printer driver or others.

The FixedDocument.fdoc 901 includes a comment of the tag 911 added by the driver or the application that has generated an XPS text and comments of the tags 912 and 913 added according to the present exemplary embodiment. However, these comments can be discriminated based on the character string added to the comment according to the exemplary embodiment. As described above, the present exemplary embodiment can disable the page link to each print-finished page by correcting the comment in the structure portion. Therefore, the conversion into a job including only the unprinted portion can be easily realized. More specifically, the present exemplary embodiment can add links to all pages that constitute page entity portions by restoring the links that were removed previously. In other words, the present exemplary embodiment can restore the link to a prior state (i.e., an uncorrected state).

Figure 11:
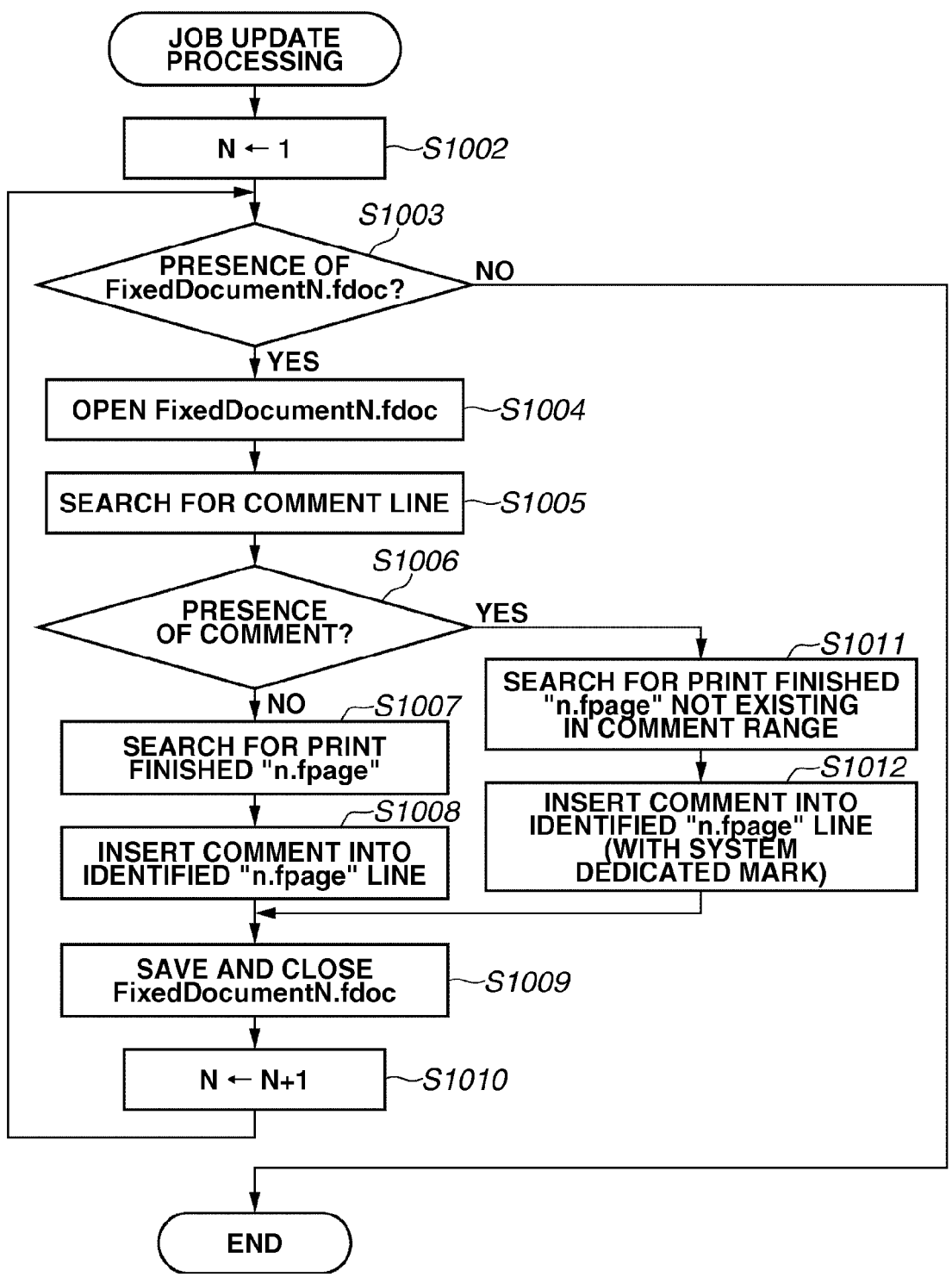
FIG. 11 is a flowchart illustrating an example procedure of data processing that can be performed by the image forming apparatus according to an exemplary embodiment.

FIG. 11 is a flowchart illustrating an example procedure of data processing that can be performed by the image forming apparatus according to an exemplary embodiment. The data processing illustrated in FIG. 11 may be usable to correct FixedDocument.fdoc in the job, and may be applicable to each of the FixedDocument.fdoc 904 format and the FixedDocument.fdoc 903 format illustrated in FIG. 10. The data processing illustrated in FIG. 11 may be also applicable to only one FixedDocument.fdoc illustrated in FIG. 8 and two or more pieces of FixedDocument.fdoc illustrated in FIG. 9.

The CPU 12 executes the program corresponding to respective steps of FIG. 11, which may be loaded from the ROM 13 to the RAM 19. As another method, the program can be stored in the external memory 14 and can be loaded to the RAM 19.

If the FixedDocument.fdoc correction processing starts, then in step S1002, the CPU 12 initializes the parameter N to "1." The parameter N serves as the pointer that indicates each one of two or more pieces of FixedDocument.fdoc. In step S1003, if the parameter N is "1", the CPU 12 determines whether the job includes any FixedDocument.fdoc. If the CPU 12 determines that the FixedDocument.fdoc is present in the job, the processing proceeds to step S1004. If in step S1003 the CPU 12 determines that the job does not include any FixedDocument.fdoc, the CPU 12 further determines whether the job includes any FixedDocument1.fdoc (although not illustrated). If the CPU 12 determines that the FixedDocument1.fdoc is present in the job, the processing proceeds to 1004. If the CPU 12 determines that the FixedDocument1.fdoc is absent in the job, the CPU 12 terminates the processing of this routine. Hereinafter, the FixedDocument.fdoc and the FixedDocumentN.fdoc (N is an integer successively incremented from 1) are collectively referred to as "FixedDocumentN.fdoc."

In step S1004, the CPU 12 opens the FixedDocumentN.fdoc whose presence was confirmed in step S1003. In step S1005, the CPU 12 confirms the presence of any comment of the opened FixedDocumentN.fdoc. Through this check, the CPU 12 can identify the presence of a comment added by the driver or the application of the client computer 4000 that generated an XPS text.

In step S1006, the CPU 12 determines whether there is a comment for the FixedDocumentN.fdoc. If the CPU 12 determines that there is no comment, i.e., when no comment is added by the XPS text creator (e.g., a driver or an application), the processing proceeds to step S1007.

If in step S1006 the CPU 12 determines that there is an added comment, i.e., when a comment is added by the XPS text creator (e.g., a driver or an application), the processing proceeds to step S1011.

In step S1007, the CPU 12 searches for a line including a print-finished "n.fpage." More specifically, the CPU 12 can identify the line including the print-finished "n.fpage" referring to "n" of "n.fpage" because "n" represents the page number.

In step S1008, the CPU 12 inserts a comment into the identified line including the "n.fpage." For example, in the FixedDocument.fdoc having the FixedDocument.fdoc 904 format illustrated in FIG. 10, if the first and second pages are in the print-finished state, the CPU 12 comments on the line including 1.fpage and the line including 2.fpage. As a result, the CPU 12 generates comment lines indicated by the tags 921 and 922 in the FixedDocument.fdoc 902 as illustrated in FIG. 10.

According to the tags 921 and 922 added to the FixedDocument.fdoc 902 illustrated in FIG. 10, the start and end marks of a comment are embedded in respective lines. Alternatively, the start and end marks may be used to encompass two or more comment lines. In the present exemplary embodiment, any method can be employed to comment on the line including 1.fpage and the line including 2.fpage.

As a result of step S1008, it is apparent that the comments described in the FixedDocument.fdoc include only the comments added according to the present exemplary embodiment, although there is no mark that indicates addition according to the present exemplary embodiment.

In step S1009, the CPU 12 stores the comment added/corrected FixedDocument.fdoc in the external memory 14 and closes the FixedDocument.fdoc.

In step S1010, the CPU 12 increments the parameter N (i.e., the pointer that indicates each one of two or more pieces of FixedDocument.fdoc) by 1. Then, the processing returns to step S1003.

In step S1011, the CPU 12 searches for a line including a print-finished "n.fpage" that does not exist in the comment range because it is apparent that the FixedDocument.fdoc includes a comment added by the XPS text creator (e.g., a driver or an application). The processing performed in step S1011 is similar to the processing performed in step S1007.

In step S1012, the CPU 12 inserts a comment into the identified line including the "n.fpage." The processing performed in step S1012 is similar to the processing performed in step S1008. More specifically, the CPU 12 adds a comment with unique marks that are embedded to discriminate the comment added according to the present exemplary embodiment from the comment added by the XPS text creator (e.g., a driver or an application).

If the FixedDocument.fdoc has a format similar to the FixedDocument.fdoc 903 format illustrated in FIG. 10 and the first and second pages are already printed, the CPU 12 comments on the line including 1.fpage and the line including 2.fpage. As a result, the CPU 12 generates comment lines indicated by the tags 912 and 913 in the FixedDocument.fdoc 901 as illustrated in FIG. 10. According to the example of FixedDocument.fdoc 901 illustrated in FIG. 10, the character string "C-LBP" is used as a mark indicating the presence of a comment. However, in another exemplary embodiment, mark indicating the presence of a comment may be replaced with another character string.

After completing the insertion of comment, the processing proceeds to step S1009. In step S1009, the CPU 12 stores the comment added/corrected FixedDocument.fdoc in the external memory 14 and closes the FixedDocument.fdoc.

As a result of the processing performed in step S1012 illustrated in FIG. 11, it is apparent that the comments described in the FixedDocument.fdoc include both the comment added according to the present exemplary embodiment (which includes the marks indicating addition according to the present exemplary embodiment) and the comment added by the XPS text creator (e.g., a driver or an application).

Through the above-described operation, the exemplary embodiment can add a comment that disables the page link to the FixedDocument.fdoc.

The above-described procedure may be applicable to a structure portion including two or more pieces of FixedDocument.fdoc, and may also be applicable to the comment added by the XPS text creator (e.g., a driver or an application)

Figure 12:
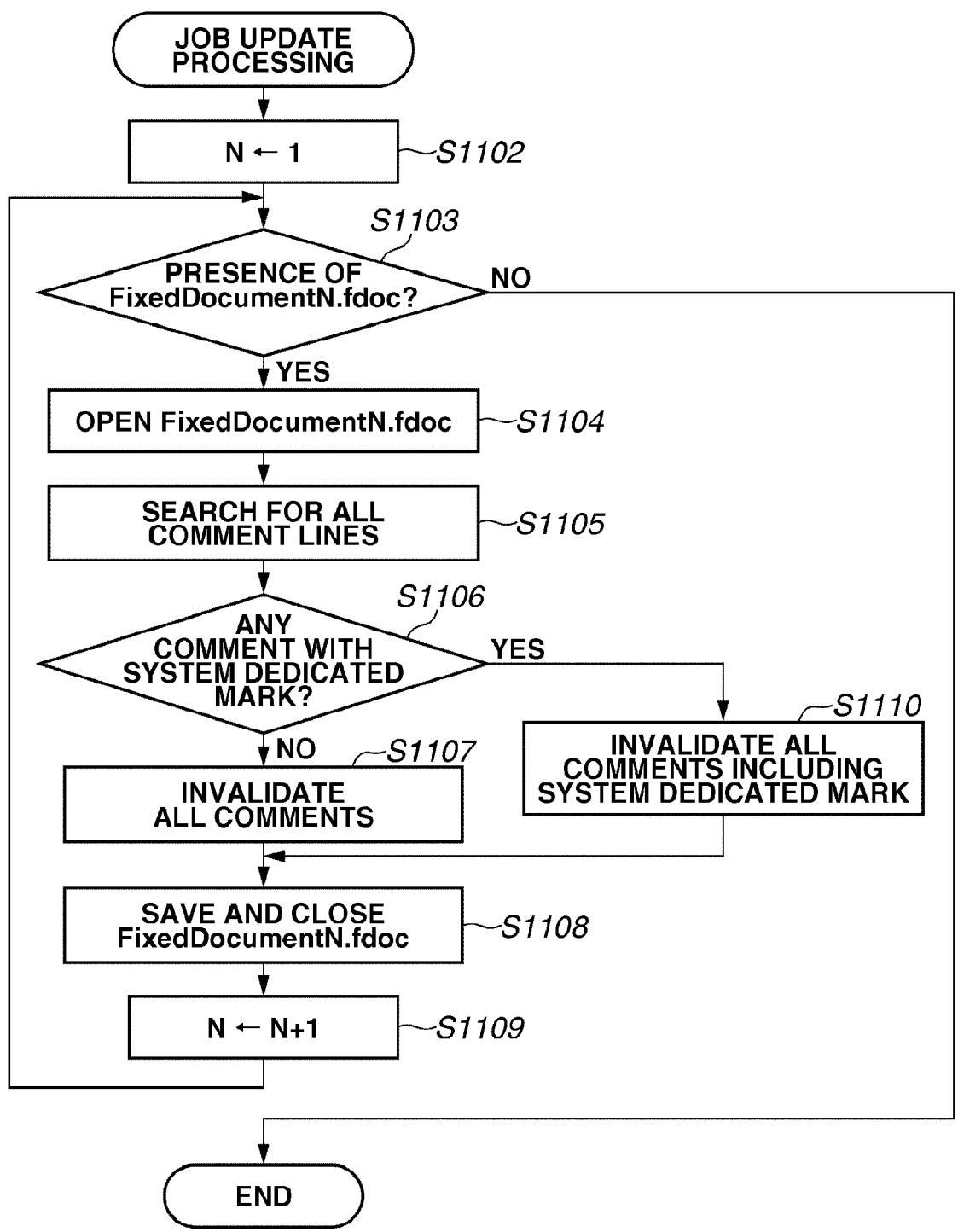
FIG. 12 is a flowchart illustrating an example procedure of data processing that can be performed by the image forming apparatus according to an exemplary embodiment.

FIG. 12 is a flowchart illustrating an example procedure of data processing that can be performed by the image forming apparatus according to an exemplary embodiment. The processing illustrated in FIG. 12 may be usable to restore the FixedDocument.fdoc whose link to the print-finished page is disabled through the processing illustrated in FIG. 11 into the original job that instructs a complete print of all pages.

The CPU 12 executes the program corresponding to respective steps of FIG. 12, which may be loaded from the ROM 13 to the RAM 19. As another method, the program can be stored in the external memory 14 and can be loaded to the RAM 19. The processing illustrated in FIG. 12 may be applicable to each of the FixedDocument.fdoc 901 format and the FixedDocument.fdoc 902 format illustrated in FIG. 10. The processing illustrated in FIG. 12 may also be applicable to only one FixedDocument.fdoc illustrated in FIG. 8 and two or more pieces of FixedDocument.fdoc illustrated in FIG. 9.

If the FixedDocument.fdoc update processing (i.e., restoration processing) starts, then in step S1102, the CPU 12 initializes the parameter N to "1." The parameter N serves as the pointer that indicates each one of two or more pieces of FixedDocument.fdoc and is stored in the RAM 2.

In step S1103, if the parameter N is "1", the CPU 12 determines whether the job includes any FixedDocument.fdoc. If the CPU 12 determines that the FixedDocument.fdoc is present, the processing proceeds to step S1104. If the CPU 12 determines that the job does not include any FixedDocument.fdoc, the CPU 12 further determines whether the job includes any FixedDocument1.fdoc (although not illustrated). If the CPU 12 determines that the FixedDocument1.fdoc is present in the job, the processing proceeds to step S1104. If the CPU 12 determines that the FixedDocument1.fdoc is absent in the job, the CPU 12 terminates the processing of this routine. Hereinafter, the FixedDocument.fdoc and the FixedDocumentN.fdoc (N is an integer successively incremented from 1) are collectively referred to as "FixedDocumentN.fdoc."

In step S1104, the CPU 12 opens the FixedDocumentN.fdoc whose presence was confirmed in step S1003. In step S1105, the CPU 12 confirms the contents of the opened FixedDocumentN.fdoc. More specifically, the CPU 12 searches for any comment added according to the present exemplary embodiment. Through this check, the CPU 12 can identify the presence of a comment added by the XPS text creator (e.g., a driver or an application).

In step S1106, the CPU 12 determines whether there is the comment added according to the present exemplary embodiment based on the result of comment search processing. If the CPU 12 determines that there is no added comment, the processing proceeds to step S1107. If the CPU 12 determines that the added comment is present, the processing proceeds to step S1110.

In step S1107, the CPU 12 invalidates all comments in the FixedDocument.fdoc and performs processing for restoring the portion encompassed by the comment to an effective description.

At the time when the processing proceeds to step S1107, it is apparent that all the comments existing in the FixedDocument.fdoc are comments added according to the present exemplary embodiment although there is no mark that indicates addition according to the present exemplary embodiment. Therefore, it is apparent that the structure capable of printing all document pages can be restored by invalidating all comments.

Hence, the CPU 12 invalidates all comments in the FixedDocument.fdoc and performs processing for restoring the portion encompassed by the comment to an effective description.

In step S1108, the CPU 12 saves the correction processed FixedDocument.fdoc and closes the FixedDocument.fdoc. In step S1109, the CPU 12 increments the parameter N by 1. The parameter N serves as the pointer that indicates each one of two or more pieces of FixedDocument.fdoc. Then, the processing returns to step S1103.

In step S1110, similar to step S1107, the CPU 12 invalidates every comment that is present in the FixedDocument.fdoc and is accompanied by the mark indicating addition according to the present exemplary embodiment.

At the time when the processing proceeds to step S1110, it is apparent that the comments existing in the FixedDocument.fdoc include both the comment added according to the present exemplary embodiment and the comment added by the XPS text creator (e.g., a driver or an application). More specifically, the comment line including the mark indicating addition according to the present exemplary embodiment is present.

Therefore, if all comments are invalidated, the comment added by the XPS text creator (e.g., a driver or an application) may be invalidated and an unexpected situation may occur.

Hence, in this case, the CPU 12 performs processing for disabling only the comment that includes the mark indicating addition according to the present exemplary embodiment and restoring the region encompassed by the comment to an effective description. Through the above-described processing, the CPU 12 can invalidate only the comment that disables the page link and, as a result, can restore the structure capable of printing all document pages. Through the above-described processing, the CPU 12 can restore the FixedDocument.fdoc from a state where the page link to a print-finished page is disabled to the original job that instructs a complete print of all pages.

The above-described procedure may be applicable to a case where two or more pieces of FixedDocument.fdoc are present or a case where a comment is added by the XPS text creator (e.g., a driver or an application).

Through the above-described processing, the exemplary embodiment can convert a structured XPS text that includes a page link connecting a structure portion to each page entity portion into a structured text that instructs printing only the unprinted portion by disabling the link to a print-finished page by correcting the structure portion.

According to the present exemplary embodiment, the page entity portion is left unchanged. Therefore, the structured text can be simply changed to the original XPS text that instructs a complete print of all pages by restoring the page link to the original one.

Moreover, the above-described system is characteristic in that the structured text itself includes information indicating each print-finished page and therefore does not require any other system.

Additionally, compared to the first exemplary embodiment, the second exemplary embodiment does not add any unique tag and can correct the structure portion by simply adding and deleting a comment to the structure portion. Therefore, an XPS text generated according to the second exemplary embodiment conforms to the XPS grammar.

FIG. 13 illustrates examples of FixedDocument.fdoc based on the XPS that may be processed by the image forming apparatus according to a third exemplary embodiment. The examples are resultant from processing for disabling the page link to each print-finished page, which may be performed together with below-described processing for correcting the FixedDocumentSequence.fdseq. In the document that includes five pages, the first and second pages are in the print-finished state.

The FixedDocument.fdoc, at the time immediately after an XPS text is generated, has a format of FixedDocument.fdoc 953 or FixedDocument.fdoc 954 illustrated in FIG. 13.

Compared to the FixedDocument.fdoc 954, the FixedDocument.fdoc 953 includes a comment line 956 that may be added by the XPS text creator (e.g., a driver or an application)

The FixedDocument.fdoc 954 does not include any comment generated by the driver or the application.

FixedDocument_add.fdoc 952 can be obtained by copying and correcting the original FixedDocument.fdoc. According to this example, the first and second pages are in the print-finished state and therefore the links to the first and second pages are all deleted. FixedDocument_add.fdoc 951 can be obtained by copying and correcting the original FixedDocument.fdoc. According to this example, the first and second pages are in the print-finished state and therefore the links to the first and second pages are all deleted. Compared to the FixedDocument_add.fdoc 952, the FixedDocument_add.fdoc 951 includes a comment line 955 that may be added by the XPS text creator (e.g., a driver or an application).

FIG. 14 illustrates examples of FixedDocumentSequence.fdseq based on the XPS that may be processed by the image forming apparatus according to an exemplary embodiment. The examples are resultant from processing for disabling the page link to each print-finished page, which may be performed together with the above-described processing for correcting the FixedDocument.fdoc.

In FIG. 14, the FixedDocumentSequence.fdseq, at the time immediately after an XPS text is generated, has a format of FixedDocumentSequence.fdseq 964 or FixedDocumentSequence.fdseq 963.

Compared to the FixedDocumentSequence.fdseq 964, the FixedDocumentSequence.fdseq 963 includes a comment line 970 that may be added by the XPS text creator (e.g., a driver or an application). The FixedDocumentSequence.fdseq 964 does not include any comment generated by the driver or the application.

FixedDocumentSequence.fdseq 962 includes a comment on a link (see a tag 968) to the original FixedDocument.fdoc and an additional link (see a tag 969) to FixedDocument_add.fdoc (i.e., a copy of the original FixedDocument.fdoc).

As described above, the content of the FixedDocument_add.fdoc (i.e., a copy of the original FixedDocument.fdoc) does not include any link to each print-finished page. Therefore, the link to each print-finished page can be disabled by correcting the structure portion.

FixedDocumentSequence.fdseq 961 includes a comment on a link (see a tag 966) to the original FixedDocument.fdoc and an additional link (see a tag 967) to FixedDocument_add.fdoc (i.e., a copy of the original FixedDocument.fdoc).

Compared to the FixedDocumentSequence.fdseq 962, the FixedDocumentSequence.fdseq 961 includes a comment line 965 that may be added by the by the XPS text creator (e.g., a driver or an application).

The comment line 966 does not include any character string that serves as a mark indicating addition according to the present exemplary embodiment, because processing for restoring the FixedDocument.fdoc line may be performed by deleting the FixedDocument_add.fdoc line. More specifically, discrimination is feasible based on the file name of the ".fdoc" line (i.e., based on the presence of "_add").

Figure 15:
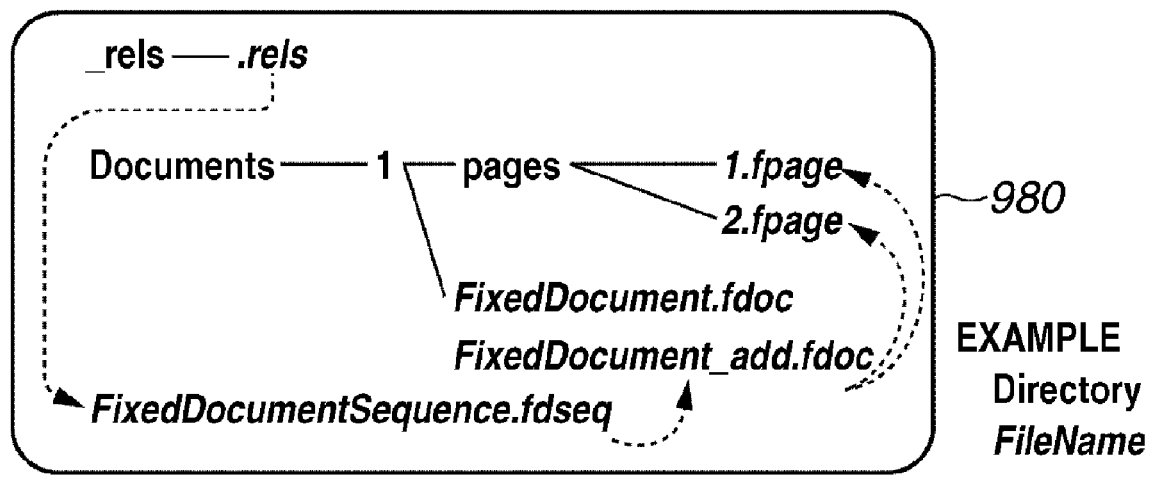
FIG. 15 illustrates a structure of an XPS text as a summary of the XPS structures illustrated in FIGS. 13 and 14.

FIG. 15 illustrates a structure of an XPS text 980 as a summary of the XPS structures illustrated in FIGS. 13 and 14. The example is in a state where the FixedDocumentSequence.fdseq illustrated in FIG. 14 includes a newly added link to the FixedDocument_add.fdoc illustrated in FIG. 13 and does not includes any link to the original FixedDocument.fdoc.

Each page entity is linked from the FixedDocument_add.fdoc except for the print-finished page and is full-item linked from the FixedDocument.fdoc. If the structured text in this state is printed, every page except for the print-finished page(s) can be printed. Although the link from the FixedDocument.fdoc to each page entity remains in the structure, there is not any link from the FixedDocument.fdoc to an upper layer and therefore it cannot be enabled. To convert the structured text in this state into a full-item print job, it is desired to restore the link to the FixedDocument.fdoc and disable the link to the FixedDocument_add.fdoc in the FixedDocumentSequence.fdseq.

Figure 16:
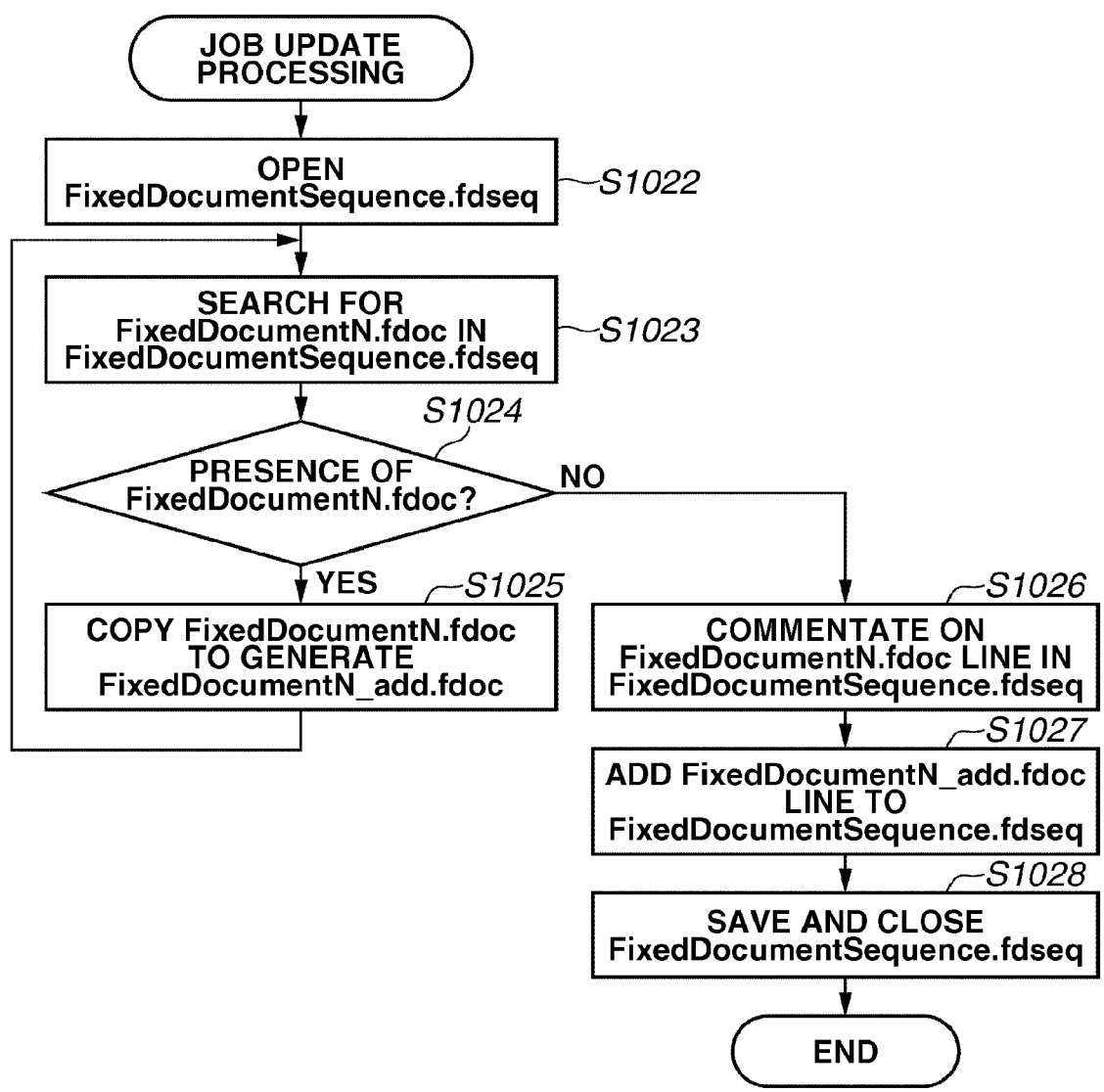
FIG. 16 is a flowchart illustrating an example procedure of data processing that can be performed by the image forming apparatus according to an exemplary embodiment.

FIG. 16 is a flowchart illustrating an example procedure of data processing that can be performed by the image forming apparatus according to an exemplary embodiment. The processing illustrated in FIG. 16 may be usable to update the FixedDocumentSequence.fdseq and copy the FixedDocument.fdoc. The processing illustrated in FIG. 16 may be applicable to the format (including only one FixedDocument.fdoc) 701 illustrated in FIG. 8 and the format (including two or more pieces of FixedDocument.fdoc) 801 illustrated in FIG. 9. The CPU 12 executes the program corresponding to respective steps of FIG. 16, which may be loaded from the ROM 13 to the RAM 19. As another method, the program can be stored in the external memory 14 and can be loaded to the RAM 19.

If the job update processing starts, then in step S1022, the CPU 12 opens the FixedDocumentSequence.fdseq. In step S1023, the CPU 12 searches the contents of the FixedDocumentSequence.fdseq for successively extracting FixedDocument.fdoc. First, the CPU 12 searches for FixedDocument.fdoc. Next, the CPU 12 searches for FixedDocument1.fdoc. Then, the CPU 12 searches for FixedDocument2.fdoc. In this manner, the CPU 12 searches for each of two or more pieces of FixedDocumentN.fdoc by incrementing the parameter N from 1.

In step S1024, the CPU 12 determines whether there is any FixedDocumentN.fdoc that maybe an object to be searched. If the CPU 12 determines that the FixedDocumentN.fdoc is present, the processing proceeds to step S1025. If the CPU 12 determines that the FixedDocumentN.fdoc is absent, the processing proceeds to step S1026.

In step S1025, the CPU 12 copies the identified FixedDocumentN.fdoc and gives it a file name "FixedDocumentN_add.fdoc." The processing returns to step S1023.

In this case, "_add" included in the file name indicates that it is a copied FixedDocumentN.fdoc. In the present exemplary embodiment, the name that may be added to discriminate the copied FixedDocumentN.fdoc is not limited to "_add" and can be any other character string that can be discriminated by the name.

Next, in step S1026, the CPU 12 performs a work for disabling the link by commenting on the line that links with the FixedDocumentN.fdoc in the FixedDocumentSequence.fdse. Through this processing, the link to the FixedDocumentN.fdoc (i.e., the original link to the print of all items) can be disabled.

In step S1027, the CPU 12 performs a work for adding a link to a newly copied FixedDocumentN_add.fdoc. In other words, the CPU 12 newly adds the link to the FixedDocumentN_add.fdoc (i.e., the link to a text following the print breakpoint).

In step S1028, the CPU 12 saves and closes the addition processed FixedDocumentSequence.fdseq, and terminates the processing of this routine.

Figure 17:
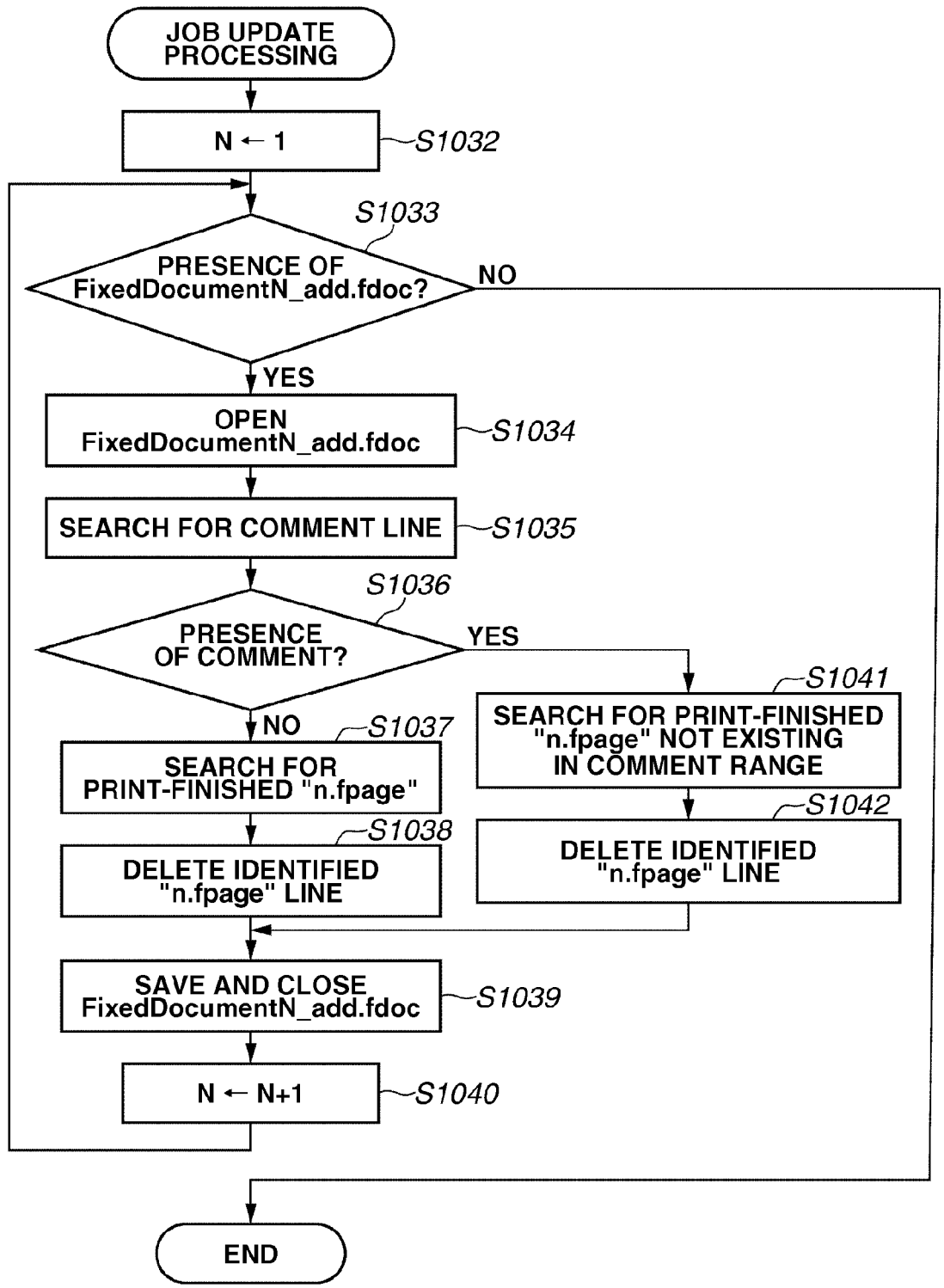
FIG. 17 is a flowchart illustrating an example procedure of data processing that can be performed by the image forming apparatus according to an exemplary embodiment.

FIG. 17 is a flowchart illustrating an example procedure of data processing that can be performed by the image forming apparatus according to an exemplary embodiment. The data processing illustrated in FIG. 17 may be usable to correct the FixedDocumentN_add.fdoc, which is generated by copying the original FixedDocumentN.fdoc.

The processing illustrated in FIG. 17 may be applicable to each of the FixedDocument.fdoc 954 format and the FixedDocument.fdoc 953 format illustrated in FIG. 13. The processing illustrated in FIG. 17 may also be applicable to only one FixedDocument.fdoc illustrated in FIG. 8 and two or more pieces of FixedDocument.fdoc illustrated in FIG. 9. The CPU 12 executes the program corresponding to respective steps of FIG. 16, which may be loaded from the ROM 13 to the RAM 19. As another method, the program can be stored in the external memory 14 and can be loaded to the RAM 19.

If the FixedDocumentN_add.fdoc correction processing starts, then in step S1032, the CPU 12 initializes the parameter N to "1." The parameter N serves as the pointer that indicates each one of two or more pieces of FixedDocumentN_add.fdoc. In step S1033, if the parameter N is 1, the CPU 12 determines whether there is the FixedDocument_add.fdoc. If the CPU 12 determines that the FixedDocument_add.fdoc is present, the processing proceeds to step S1034. If the CPU 12 determines that the FixedDocument_add.fdoc is absent, the CPU 12 further determines whether there is any FixedDocument1_add.fdoc (although not illustrated). If the CPU 12 determines that the FixedDocument1_add.fdoc is present, the processing proceeds to step S1034. If the CPU 12 determines that the FixedDocument1_add.fdoc is absent, the CPU 12 terminates the processing of this routine. Hereinafter, the FixedDocument_add.fdoc and the FixedDocumentN_add.fdoc (N is an integer successively incremented from 1) are collectively referred to as "FixedDocumentN_add.fdoc."

In step S1034, the CPU 12 opens the FixedDocumentN_add.fdoc whose presence was confirmed in step S1033. In step S1035, the CPU 12 confirms the presence of any comment line in the opened FixedDocumentN_add.fdoc. Through this check, the CPU 12 can identify the presence of a comment added by the XPS text creator (e.g., a driver or an application).

In step S1036, the CPU 12 determines whether there is any comment. If the CPU 12 determines that no comment is present, i.e., when there is not any comment added by the XPS text creator (e.g., a driver or an application), the processing proceeds to step S1037.

If in step S1036, the CPU 12 determines that a comment is present, i.e., where there is a comment added by the XPS text creator (e.g., a driver or an application), the processing proceeds to step S1041.

In step S1037, the CPU 12 searches for a line including a print-finished "n.fpage." More specifically, the CPU 12 can identify the line including the print-finished "n.fpage" referring to "n" of "n.fpage" because "n" represents the page number.

In step S1038, the CPU 12 deletes the line including the identified n.fpage.

If the first and second pages are in the print-finished state in the FixedDocumentN_add.fdoc having the FixedDocument.fdoc 954 format illustrated in FIG. 13, the CPU 12 deletes the line including 1.fpage and the line including 2.fpage. As a result, the CPU 12 generates FixedDocumentN_add.fdoc similar to the FixedDocument_add.fdoc 952 illustrated in FIG. 13.

Then, in step S1039, the CPU 12 saves and closes the FixedDocumentN_add.fdoc whose link to the "n.fpage" is deleted. In step S1040, the CPU 12 increments the parameter N by 1. The parameter N serves as the pointer that indicates each one of two or more pieces of FixedDocumentN_add.fdoc. Then, the processing returns to step S1033.

On the other hand, in step S1041, the CPU 12 searches for any line including a print-finished "n.fpage" that does not exist in the comment range because it is apparent that the FixedDocumentN_add.fdoc includes a comment added by the XPS text creator (e.g., a driver or an application). The processing performed in step S141 is similar to the processing performed in step S1037.

In step S1042, the CPU 12 deletes the line including the identified "n.fpage." The processing in step S1042 is similar to the processing in step S1038. Then, the processing proceeds to step S1039. If the first and second pages are in the print-finished state in the FixedDocumentN_add.fdoc having the FixedDocument.fdoc 953 format illustrated in FIG. 13, the CPU 12 deletes the line including 1.fpage and the line including 2.fpage.

As a result, the CPU 12 generates FixedDocumentN_add.fdoc similar to the FixedDocumentN_add.fdoc 951 illustrated in FIG. 13. The FixedDocumentN_add.fdoc 951 includes the comment line 955 similar to the comment line 956 of the FixedDocumentN_add.fdoc 953. Through the above-described operation, the original FixedDocument.fdoc can be left unchanged and the link from its copy (i.e., FixedDocument_add.fdoc) to the print-finished page can be disabled.

The present exemplary embodiment can further unlink the original FixedDocument.fdoc from the FixedDocumentSequence.fdseq and newly link it with its copy (i.e., FixedDocument_add.fdoc) to create a structured text that instructs printing only the unprinted portion.

The above-described procedure may be applicable to a structure portion including two or more pieces of FixedDocument.fdoc, and may also be applicable to the comment added by the XPS text creator (e.g., a driver or an application)

Figure 18:
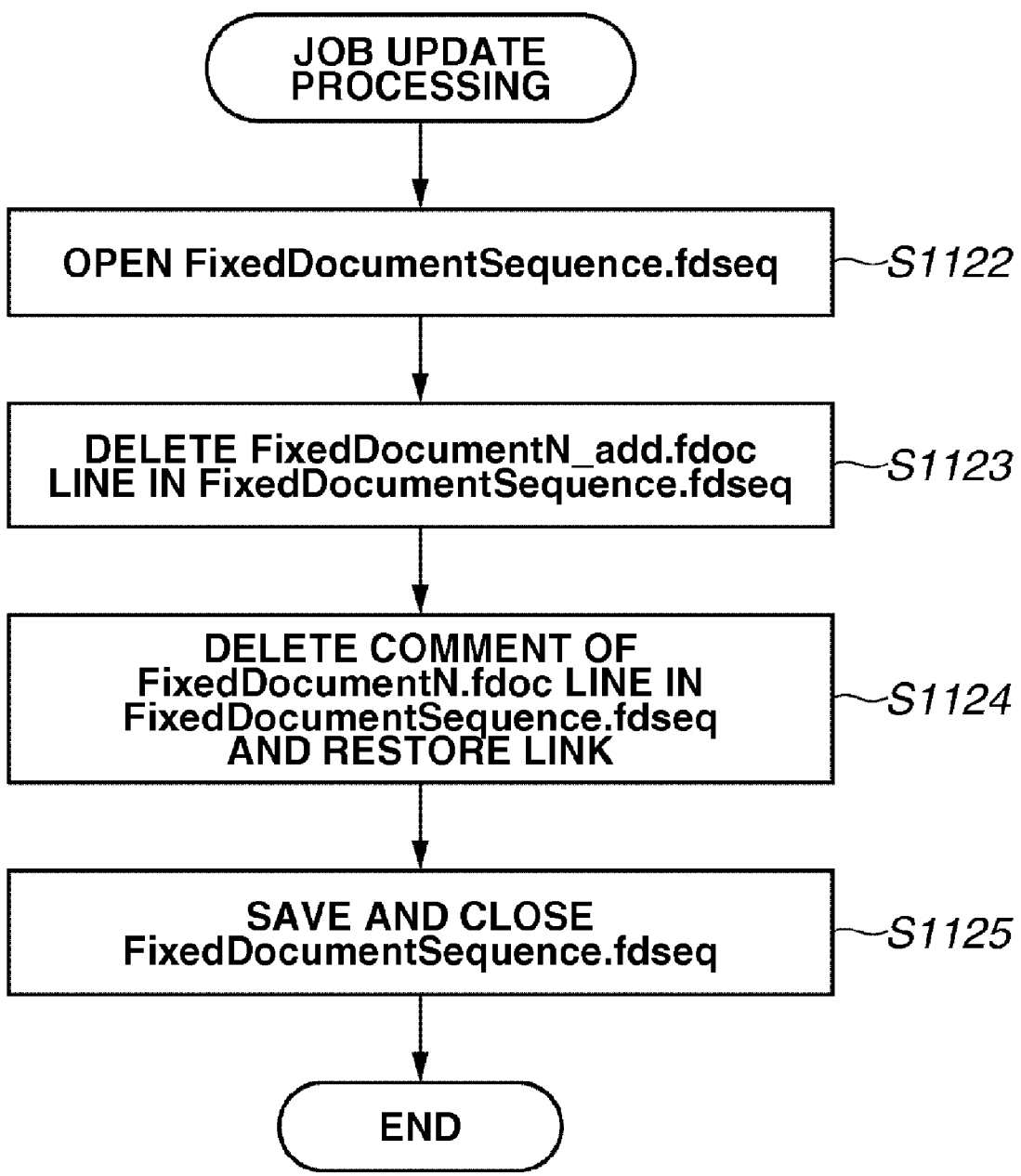
FIG. 18 is a flowchart illustrating an example procedure of data processing that can be performed by the image forming apparatus according to an exemplary embodiment.

FIG. 18 is a flowchart illustrating an example procedure of data processing that can be performed by the image forming apparatus according to an exemplary embodiment. The processing illustrated in FIG. 18 may be usable to restore the FixedDocumentSequence.fdseq whose link to the print-finished page is disabled to the job that instructs a complete print of all pages (see operations illustrated in FIGS. 15 and 16).

The processing illustrated in FIG. 18 may be applicable to the FixedDocumentSequence.fdseq 961 format and the FixedDocumentSequence.fdseq 962 format illustrated in FIG. 14. The CPU 12 executes the program corresponding to respective steps of FIG. 18, which may be loaded from the ROM 13 to the RAM 19. As another method, the program can be stored in the external memory 14 and can be loaded to the RAM 19.

If the FixedDocumentSequence.fdseq update processing (i.e., restoration processing) starts, then in step S1122, the CPU 12 opens the FixedDocumentSequence.fdseq. In step S1123, the CPU 12 deletes any line including the link to the FixedDocument_add.fdoc in the FixedDocumentSequence.fdseq. Thus, the link to a structure portion of the job that indicates a print breakpoint can be disabled. In the present exemplary embodiment, the link to the job structure indicating the print breakpoint is the FixedDocument_add.fdoc that includes the character string "_add" added to the original link. In another exemplary embodiment, the character string "_add" may be replaced with another character string.

In step S1124, the CPU 12 deletes the comment relating to the original FixedDocumentN.fdoc in the FixedDocumentSequence.fdseq and restores the link.

Thus, the original link to the FixedDocumentN.fdoc that instructs a complete print of all pages can be restored.

In step S1125, the CPU 12 saves and closes the FixedDocumentSequence.fdseq and terminates the processing of this routine. Through the above-described processing, the present exemplary embodiment can restore the FixedDocumentSequence.fdseq whose link to the print-finished page is disabled to the original job that instructs a complete print of all pages. The above-described procedure may also be applicable to the comment added by the XPS text creator (i.e., a driver or an application).

Through the above-described processing, the exemplary embodiment can convert a structured XPS text that includes a page link connecting a structure portion to each page entity portion into a structured text that instructs printing only the unprinted portion by disabling the link to each print-finished page by correcting the structure portion.

According to the present exemplary embodiment, the page entity portion is left unchanged. Therefore, the structured text can be simply changed to the original XPS text that instructs a complete print of all pages by restoring the page link to the original one.

Moreover, the above-described system is characteristic in that the structured text itself includes information indicating each print-finished page and therefore does not require any other system.

Additionally, compared to the first exemplary embodiment, the third exemplary embodiment does not add any unique tag and can correct the structure portion by simply adding and deleting a comment to the structure portion. Therefore, an XPS text generated according to the second exemplary embodiment conforms to the XPS grammar.

Accordingly, an XPS text generated according to the third exemplary embodiment conforms to the XPS grammar.

Figure 19:
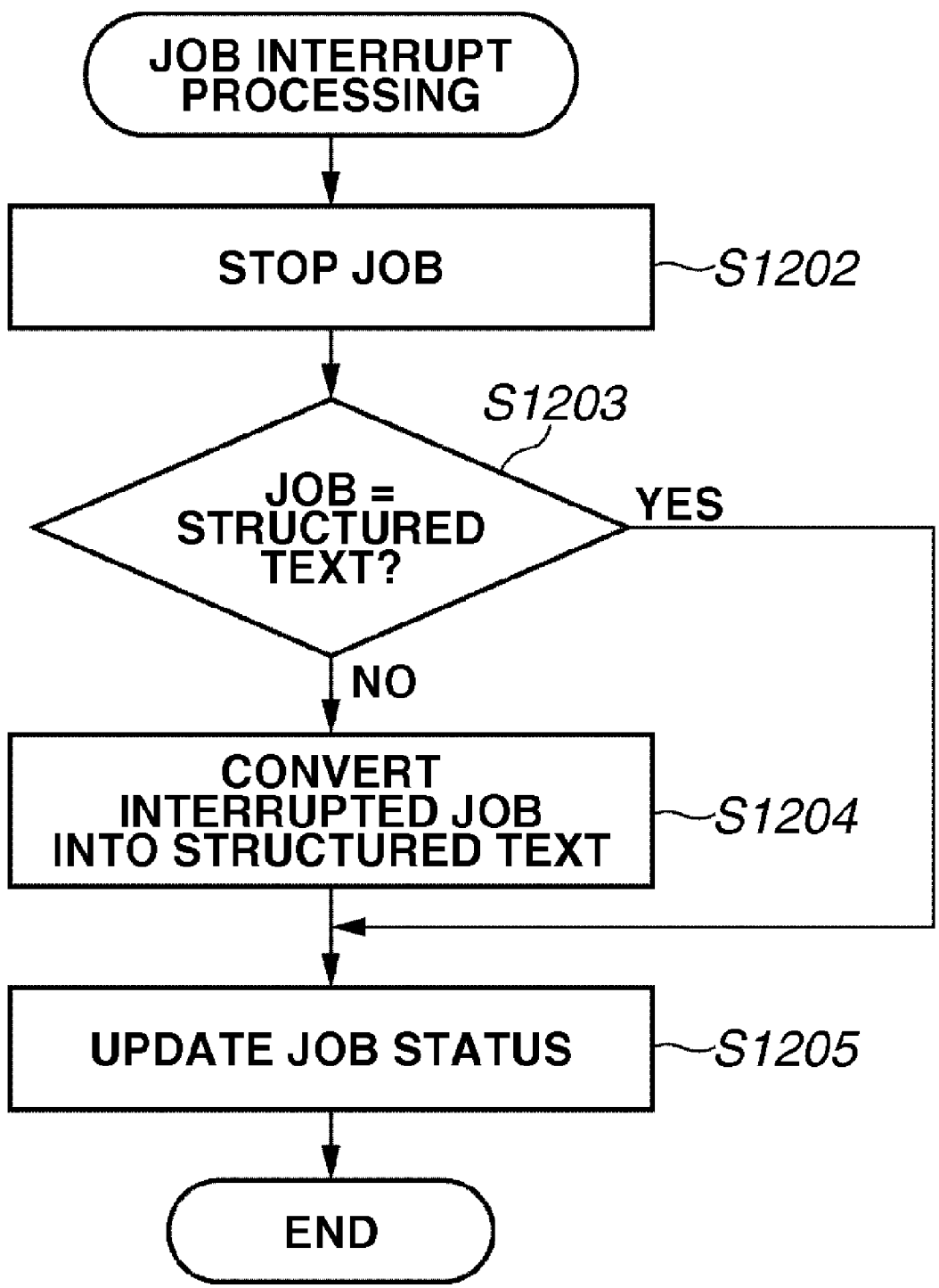
FIG. 19 is a flowchart illustrating an example procedure of data processing that can be performed by the image forming apparatus according to an exemplary embodiment.

FIG. 19 is a flowchart illustrating an example procedure of data processing that can be performed by the image forming apparatus according to an exemplary embodiment. The processing illustrated in FIG. 19 may be usable to structuralize an unstructured text.

In the present exemplary embodiment, if an unstructured job (e.g., PCL or PostScript) is sent from the client computer 4000 to the printer 5000, the unstructured job can be converted into a structured job that may be further processed. The CPU 12 executes the program corresponding to respective steps of FIG. 19, which may be loaded from the ROM 13 to the RAM 19. As another method, the program can be stored in the external memory 14 and can be loaded to the RAM 19.

If the job interrupt processing starts, then in step S1202, the CPU 12 performs job interrupt processing to stop the job.

In step S1203, the CPU 12 determines whether the job is a structured text referring to the header information of the job. In this case, the CPU 12 may check some bytes of the header information to identify the type of each job (e.g., PCL, PostScript, and XPS). If the CPU 12 determines that the job that may be processed is not a structured text (for example, when the job is PCL or PostScript), the processing proceeds to step S1204. If the CPU 12 determines that the job that may be processed is a structured text, the processing proceeds to step S1205.

In step S1204, the CPU 12 performs processing for converting the suspended job into a structured text. More specifically, the CPU 12 makes a file of each page entity, as illustrated by the page entity portions 403 to 406 in FIG. 4. The file may include texts and image information (e.g., JPEG files) or other contents.

The CPU 12 makes the structure portion 402 that has a link structure associated with respective page entities, as illustrated in FIG. 4. Then, the CPU 12 generates a structured text that may be summarized using an archive tool such as "Zip." The Zip is a data compression format or a file format that was developed and introduced by Phillip W. Katz.

In step S1205, the CPU 12 performs job status update processing for converting the status 312 to the status 316 illustrated in FIG. 3. Then, the CPU 12 terminates the processing of this routine.

Through the above-described processing, if an unstructured job (e.g., PCL or PostScript) is sent from the client computer 4000 to the printer 5000, the CPU 12 can convert it into a structured text similar to the XPS text before it is processed. Needless to say, if the received job is a structured text, the CPU 12 does not execute the above-described conversion processing.

Example processing performed by the image forming apparatus according to a fourth exemplary embodiment is described below with reference to a user interface that can be displayed by the operation unit 22 of the printer 5000 illustrated in FIG. 1.

FIGS. 20 to 23 illustrate examples of user interfaces that can be displayed by the operation unit 22 illustrated in FIG. 1. The user interfaces illustrated in FIGS. 20 to 23 are usable to instruct resuming or restarting the print of a job that was suspended due to occurrence of an error or in response to an interrupt job. The operation unit 22 includes a touch panel that enables users to input instructions by operating buttons formed thereon. Needless to say, the present invention is not limited to a system that employs a touch panel.

Figure 20:
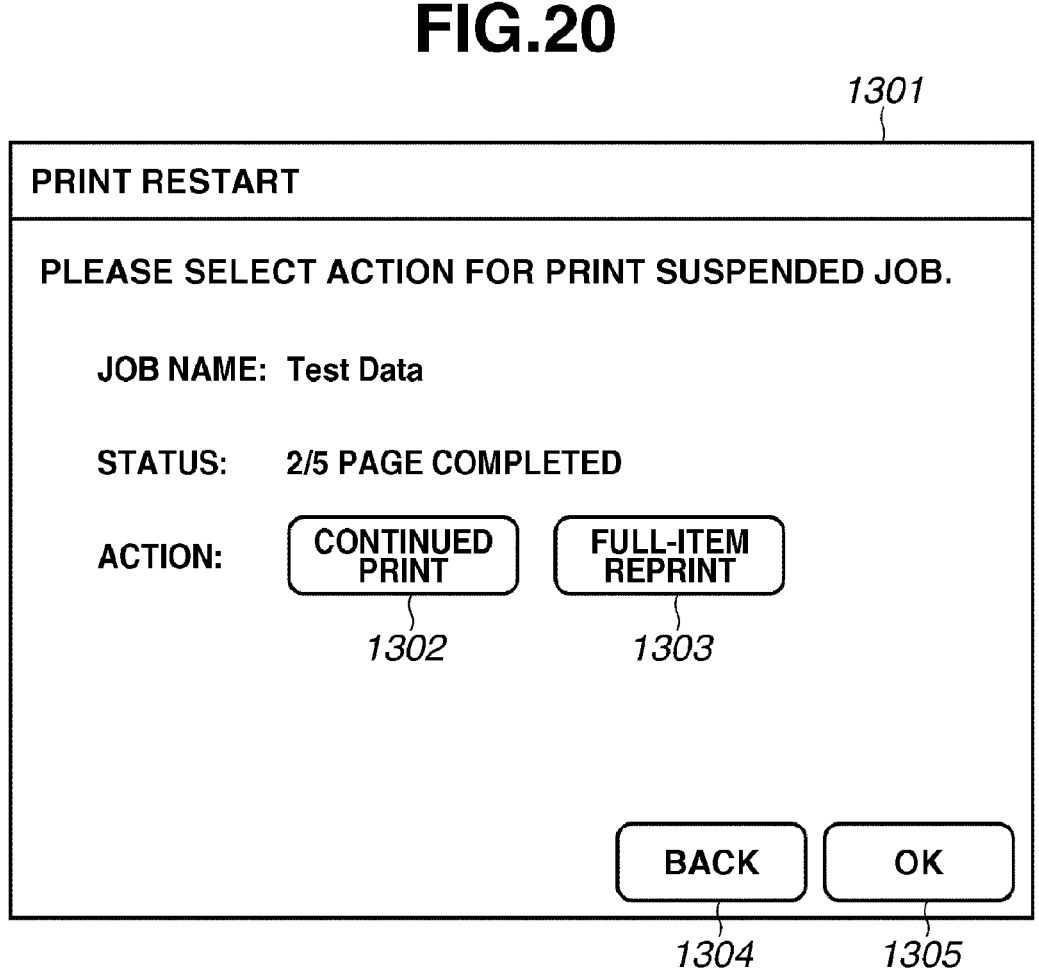
FIG. 20 illustrates an example of a user interface that can be displayed on an operation unit illustrated in FIG. 1.

In FIG. 20, a print restart screen 1301 is an example screen that can be displayed by the operation unit 22 of the printer 5000. The print restart screen 1301 is, for example, displayed when the job is suspended due to occurrence of an error or in response to an interrupt job. The print restart screen 1301 includes a button 1302 that enables users to instruct continued print and a button 1303 that enables users to instruct full-item reprint.

In the present exemplary embodiment, the CPU 12 restarts the suspended job upon recovery from the error state or upon completion of the interrupt job that is preferentially processed. In this case, users can resume the suspended job from the breakpoint by selecting the button 1302 or restart the job from the beginning by selecting the button 1303. In this manner, the CPU 12 allows users to select a start point of the print job when the print of the suspended job is started.

If the button 1302 is selected by a user's operation and an OK button 1305 is pressed, the CPU 12 causes the print unit 17 to directly print a structured text having a structure similar to the FixedDocumen.fdoc 901 or FixedDocumen.fdoc 902 illustrated in FIG. 10 (i.e., resumes the print from the breakpoint).

If the button 1303 is selected by a user's operation and the button 1305 is pressed, the CPU 12 starts the processing illustrated in FIG. 12 and converts a structured text having a structure similar to the FixedDocumen.fdoc 901 or FixedDocumen.fdoc 902 illustrated in FIG. 10 into a structured text having a structure similar to the FixedDocumen.fdoc 903 or the FixedDocumen.fdoc 904 illustrated in FIG. 10. Then, the CPU 12 causes the print unit 17 to perform print of all items.

If a back button 1304 is pressed by a user, the processing returns to a previous screen (not illustrated) from the print restart screen 1301. The following screens have back and OK buttons functionally similar to those illustrated in FIG. 20.

Figure 21:
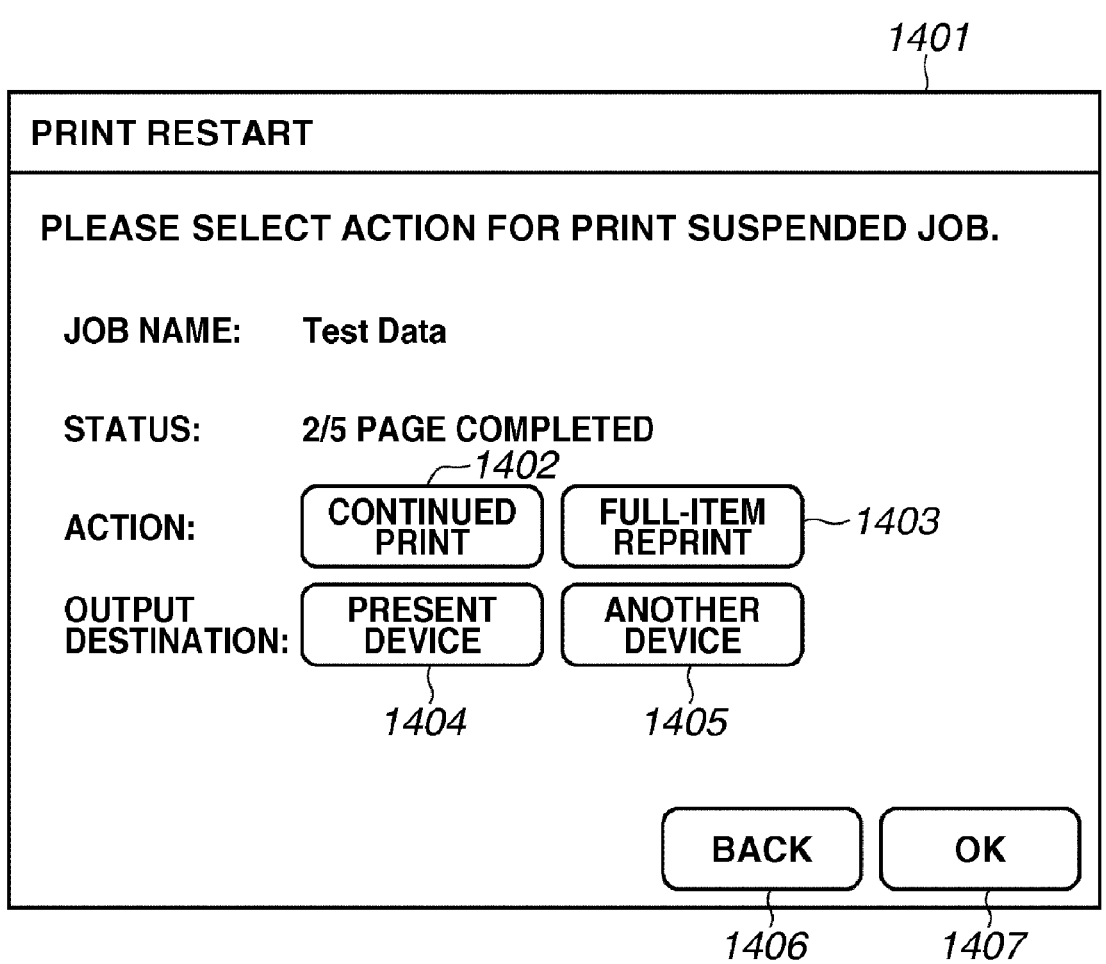
FIG. 21 illustrates an example of a user interface that can be displayed on the operation unit illustrated in FIG. 1.

FIG. 21 illustrates an example of a print restart screen 1401 that includes two buttons 1404 and 1405 enabling users to select an output destination in addition to buttons 1402 and 1403 that are functionally similar to the buttons 1302 and 1303 of the print restart screen 1301 illustrated in FIG. 20.

In FIG. 21, if the button 1404 is selected and an OK button 1407 is pressed, the print restart processing may be performed by the device that displays the print restart screen 1401.

Figure 23:
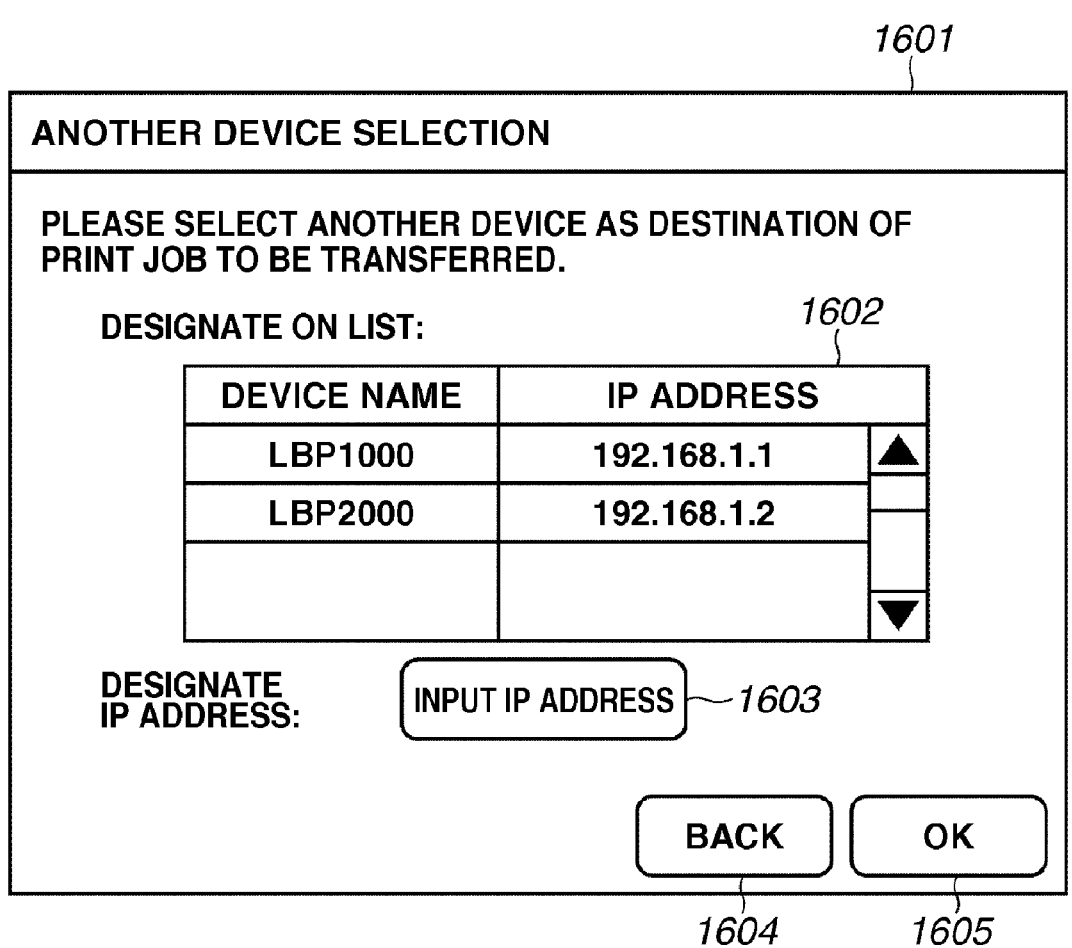
FIG. 23 illustrates an example of a user interface that can be displayed on the operation unit illustrated in FIG. 1.

If the button 1405 is selected and the OK button 1407, another device selection screen 1601 as illustrated in FIG. 23 may be displayed on the operation unit 22 to enable users to instruct transferring the job to a device other than the device that displays the print restart screen 1401. A back button 1406 is functionally similar to the back button 1304.

FIG. 22 illustrates a print restart screen 1501 as a modified version of the print restart screen 1401 illustrated in FIG. 21. The print restart screen 1501 includes an additional button 1506 that enables users to select a device-dependent memory card as an output destination in addition to the output destinations illustrated in FIG. 21. The device-dependent memory card is, for example, the external memory 14 illustrated in FIG. 1. Two buttons 1502 and 1503 are functionally similar to the above-described buttons 1302 and 1303. Two buttons 1504 and 1505 are functionally similar to the buttons 1404 and 1405 illustrated in FIG. 21. A back button 1507 is functionally similar to the button 1304 illustrated in FIG. 20. An OK button 1508 is functionally similar to the button 1305 illustrated in FIG. 20.

Figure 25:
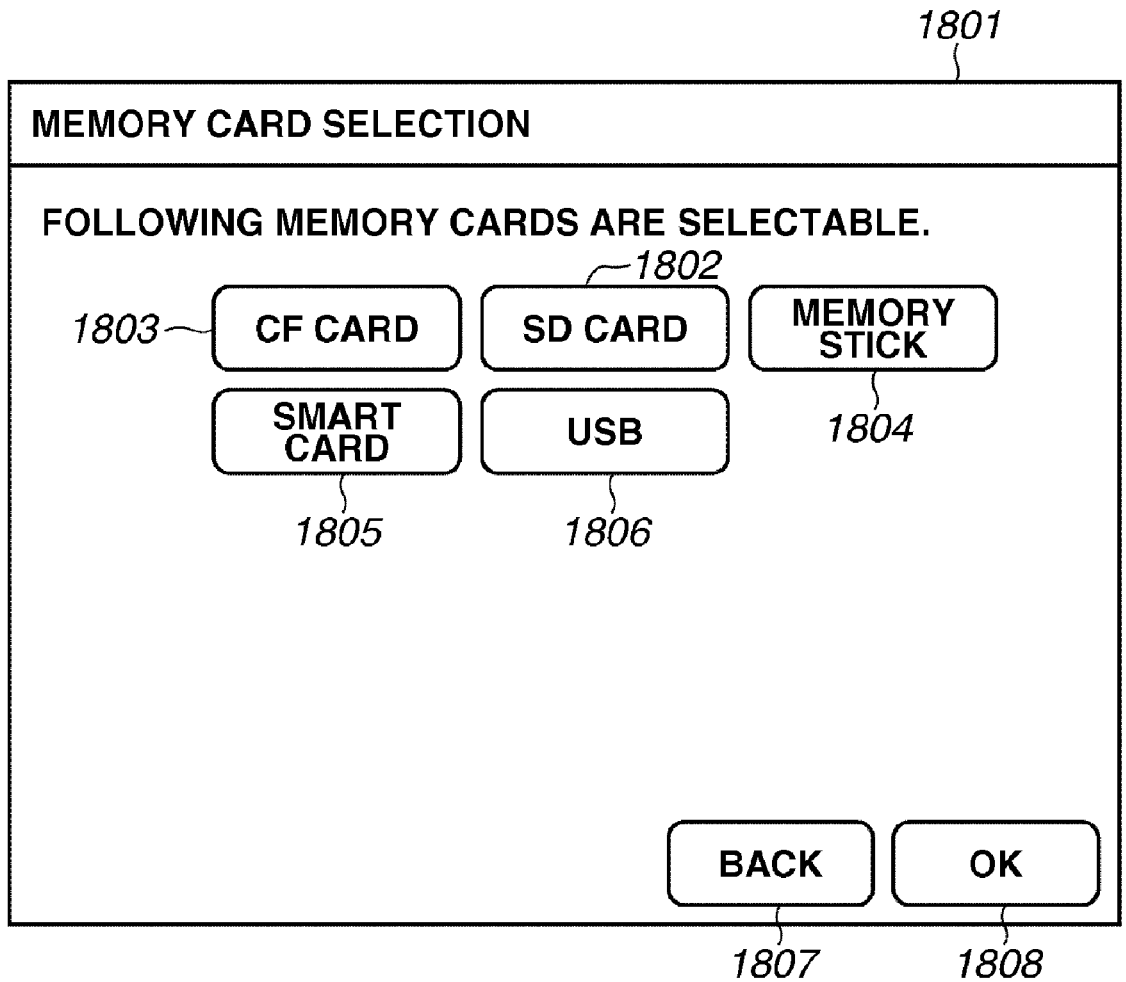
FIG. 25 illustrates an example of a user interface that can be displayed on the operation unit illustrated in FIG. 1.

If the button 1506 illustrated in FIG. 22 is selected and the button 1508 is pressed, a memory card selection screen 1801 illustrated in FIG. 25 may be displayed by the operation unit 22 to enable users to select one of a plurality of memory card devices that are currently available as an output destination.

FIG. 23 illustrates an example of the other device selection screen 1601, which is an example of a screen that can be displayed by the operation unit 22 if the button 1405 illustrated in FIG. 21 is selected.

In the present exemplary embodiment, the screen 1601 includes a list 1602 that may display one or more devices, to which data can be transferred via a network, together with a device name and an IP address.

Figure 24:
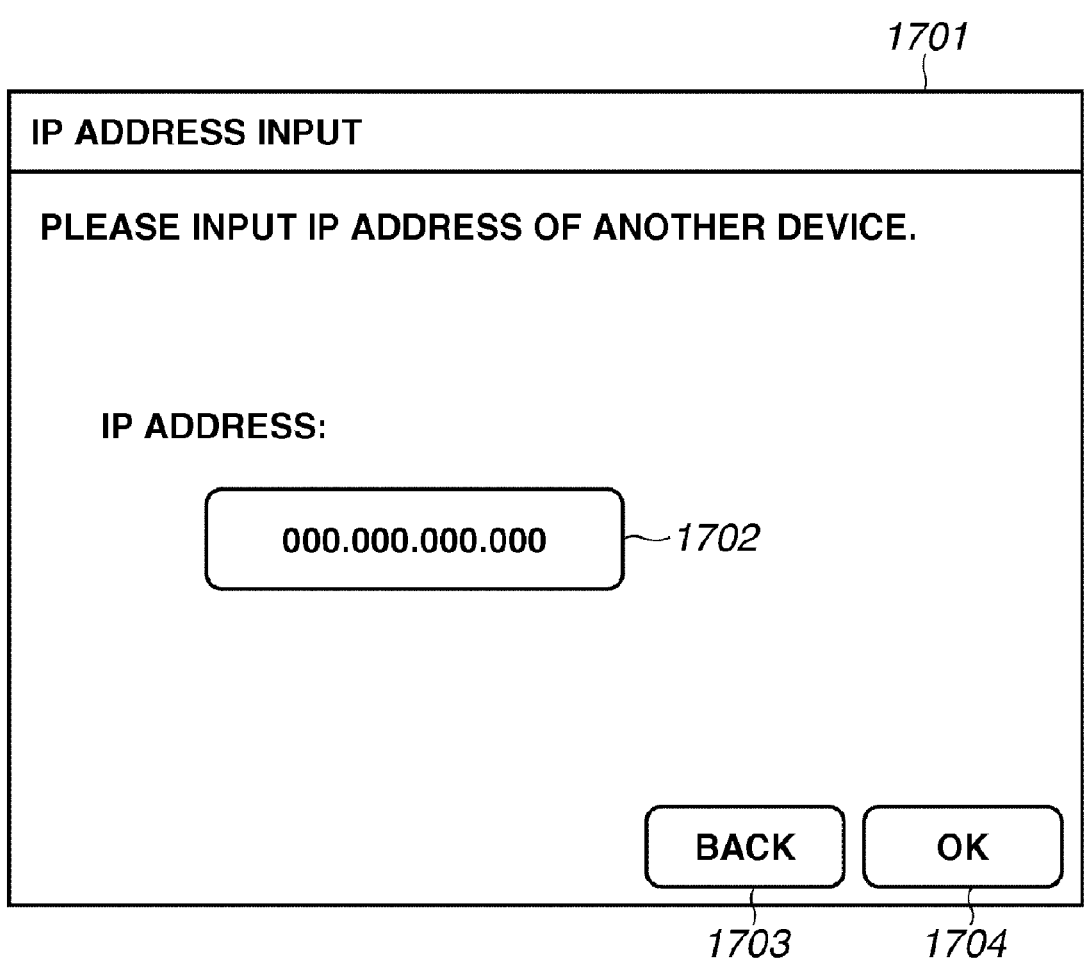
FIG. 24 illustrates an example of a user interface that can be displayed on the operation unit illustrated in FIG. 1.

Users can select a desirable one of the devices in the list 1602. Alternatively, if the list 1602 does not include any desired device, users can select a button 1603 to designate other device and press an OK button 1605. Through this operation, an IP address input screen 1701 as illustrated in FIG. 24 may be displayed by the operation unit 22 to enable users to directly input an IP address. A back button 1604 is functionally similar to the button 1304 illustrated in FIG. 20.

The IP address input screen 1701 illustrated in FIG. 24 includes an input field 1702, into which users can directly enter an IP address via the operation unit 22 that is equipped with operating keys. When an OK button 1704 is pressed, the entered IP address is accepted. A back button 1703 is functionally similar to the button 1304 illustrated in FIG. 20.

FIG. 25 illustrates an example of a screen that can be displayed by the operation unit 22 if the button 1506 illustrated in FIG. 22 is selected and the button 1508 is pressed. The screen illustrated in FIG. 25 displays memory cards that are currently available. The memory cards illustrated in FIG. 25 are mere examples. Any other memory cards can be displayed if they are available. Users can press a button 1803 to select a CF card as a desired memory card. Users can press a button 1802 to select an SD card as a desired memory card. Users can press a button 1804 to select a memory stick as a desired memory card. Users can press a button 1805 to select a smart card as a desired memory card. Users can press a button 1806 to select a USB memory as a desired memory card.

For example, if the button 1806 is selected and a button 1808 is pressed, an XPS structured job may be output to the USB memory. The USB memory is attachable to and detachable from an external input interface (not illustrated). An OK button 1807 is functionally similar to the above-described button 1304.

With the above-described screen processing, users can select the continued print (according to which the print resumes from the breakpoint) or the full-item reprint (according to which the print can restart from the beginning), and can transfer the suspended job to another printing machine or can output the suspended job to an external memory.

In the case where the suspended job is transferred to other device in response to selection of the button 1405 illustrated in FIG. 21, a device that may receive the transferred job can perform various functions according to an exemplary embodiment.

FIG. 26 illustrates an example of a user interface that can be displayed by the image forming apparatus according to a fifth exemplary embodiment. The user interface illustrated in FIG. 26 is an example of a job print screen that may be displayed when a job receiver side examines a print ticket that may be included in the received suspended job and determines that the suspended job is required to be processed as a full-item print job.

In FIG. 26, a job print screen 2101 may be displayed when the job receiver side examines the received print ticket in the suspended job and determines that the suspended job is required to be processed as a full-item print job. Detailed determination processing is described below with reference to a flowchart illustrated in FIG. 27.

For example, if the job includes a staple designation, not only the staple state of a suspended preceding print job may be incomplete but also the staple state of a resumed remaining print job may be incomplete. In such cases, it is generally desired to restart the print from the beginning to obtain a complete print of all items.

Hence, according to the job print screen 2101 illustrated in FIG. 26, a reason field 2102 is provided to describe the reason why switching to the full-item reprint is preferred. According to the example illustrated in FIG. 26, the reason is "presence of staple designation."

If a button 2103 is selected by a user's operation, the print restart processing may be forcibly resumed from the breakpoint. If a button 2104 is selected, the print restart processing can be started from the beginning for printing of full-items. A back button 2105 is functionally similar to the button 1304 illustrated in FIG. 20. An OK button 2106 is functionally similar to the above-described button 1305.

Figure 27:
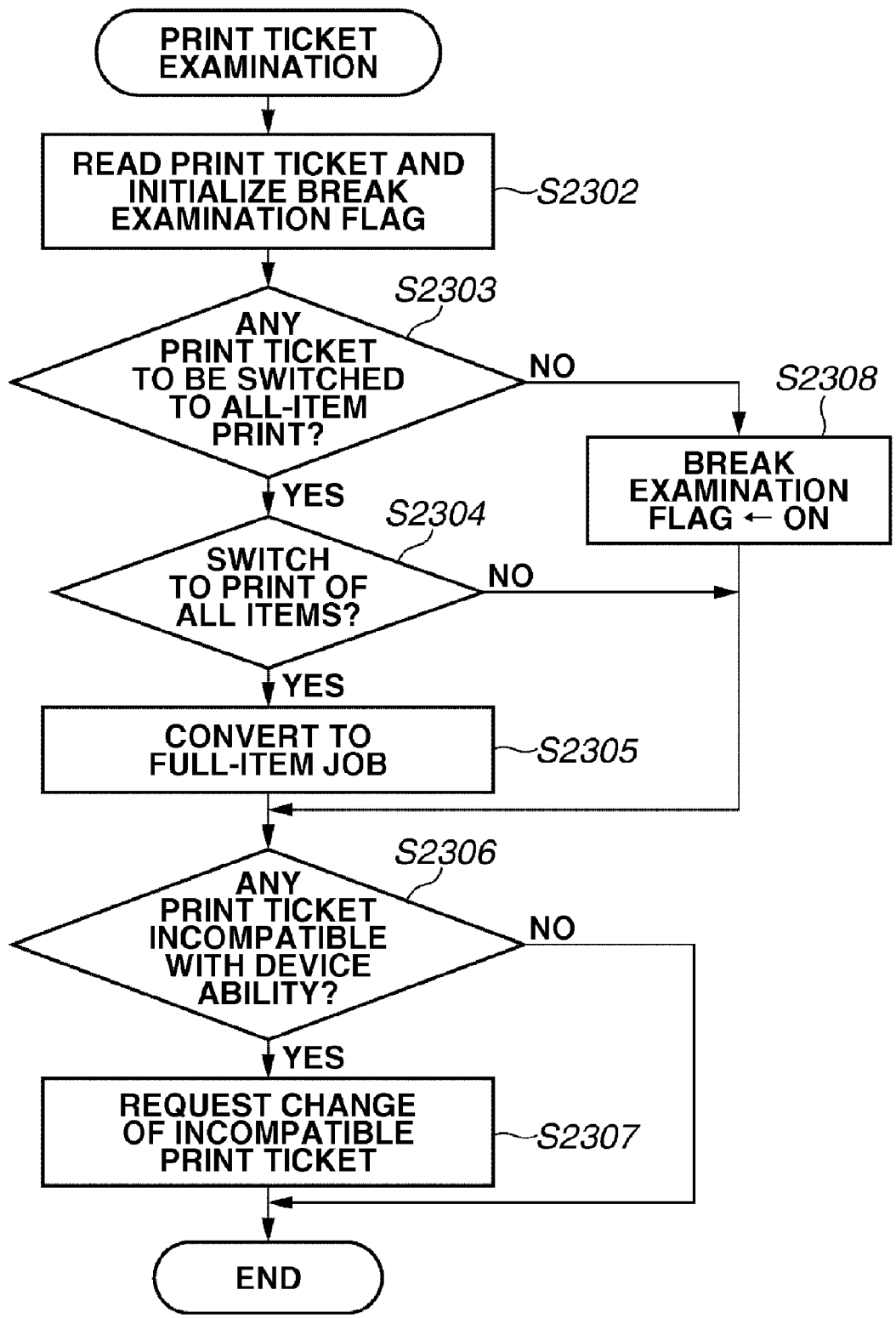
FIG. 27 is a flowchart illustrating an example procedure of data processing that can be performed by the image forming apparatus according to an exemplary embodiment.

FIG. 27 is a flowchart illustrating an example procedure of data processing that can be performed by the image forming apparatus according to an exemplary embodiment. The processing illustrated in FIG. 27 is processing that may be performed by the job receiver side that examines the received print ticket in the suspended job and determines that the suspended job is required to be processed as a full-item print job. The CPU 12 executes the program corresponding to respective steps of FIG. 27, which may be loaded from the ROM 13 to the RAM 19. As another method, the program can be stored in the external memory 14 and can be loaded to the RAM 19.

If the print ticket examination processing starts, then in step S2302, the CPU 12 reads a print ticket (not illustrated) attached to a structured text that may be loaded to the RAM 19. The CPU 12 also initializes a break examination flag. Namely, the break examination flag is brought into an OFF state.

In step S2303, the CPU 12 determines whether the examined print ticket includes an attribute to be switched to the full-item reprint. For example, staple attribute, collate attribute, and two-sided print attribute are attributes that are not preferable for the continued print and to be switched to the full-item reprint so that a better result can be obtained. In the present exemplary embodiment, these attributes are determined beforehand and stored in the ROM 13, the RAM 19, or the external memory 14, so that the CPU 12 can execute confirmation processing.

If the CPU 12 determines that the print ticket includes an attribute suitable for the full-item reprint, the processing proceeds to step S2304. If the CPU 12 determines that the print ticket does not include any attribute suitable for the full-item reprint, the processing proceeds to step S2308.

In step S2304, the CPU 12 determines whether to perform the full-item reprint based on an inquiry using the job print screen 2101 illustrated in FIG. 26 that can be displayed by the operation unit 22 to enable users to select the full-item reprint.

Instead of relying on a user's decision, according to another aspect of the present exemplary embodiment, the CPU 12 can automatically execute the continued print processing or automatically execute the full-item reprint.

If the CPU 12 selects the full-item reprint, the processing proceeds to step S2305. If the CPU 12 selects the continued print, the processing proceeds to step S2306.

In step S2305, the CPU 12 performs the processing illustrated in FIG. 12 to convert the format of the FixedDocument.fdoc from the FixedDocument.fdoc 901 format or the FixedDocument.fdoc 902 format to the FixedDocument.fdoc 903 format or the FixedDocument.fdoc 904 format as illustrated in FIG. 13. Through the processing described above, the print job can be converted into a full-item print job. Alternatively, the CPU 12 performs the processing illustrated in FIG. 18 to convert the format of the FixedDocumentSequence.fdseq from the FixedDocumentSequence.fdseq 961 format or the FixedDocumentSequence.fdseq 962 format to the FixedDocumentSequence.fdseq 963 format or the FixedDocumentSequence.fdseq 964 format as illustrated in FIG. 14. Through the processing described above, the print job can be converted into a full-item print job.

In step S2308, the CPU 12 turns the break examination flag into an ON state, so that this information can be used to determine whether to perform the processing for determining whether the received job is a suspended job. Then, the processing proceeds to step S2306.

In step S2306, the CPU 12 determines whether the print ticket includes any attribute incompatible to device ability. For example, if a job transfer side is a device capable of performing A3 print and the print ability of a job receiver side is limited to A4 and smaller sizes, the designated sheet size (i.e., A3) is an attribute incompatible to the device ability.

If the job transfer side is capable of performing two-sided print and the job receiver side cannot perform the two-sided print, the print method (i.e., one-sided or two-sided) is incompatible to the device ability. Therefore, it is required to change the print method. These attributes are mere examples and there may be another attributes that are incompatible to the device ability.

If the CPU 12 determines that the print ticket includes an attribute incompatible to the device ability, the processing proceeds to step S2307. If the CPU 12 determines that the print ticket does not include any attribute incompatible to the device ability, the CPU 12 terminates the processing of this routine.

In step S2307, the CPU 12 causes the operation unit 22 to display a job print screen 2001 as illustrated in FIG. 28. The job print screen 2001 requests users to change the incompatible attribute(s) displayed thereon. The CPU 12 reflects a change, if it is entered, to the print ticket and continues the print processing.

Then, the CPU 12 performs break examination flag determination. If the break examination flag is ON, the CPU 12 executes job examination processing illustrated in FIG. 29. If the break examination flag is OFF, the CPU 12 terminates the processing of this routine.

The job print screen 2001 illustrated in FIG. 28 may be displayed by the operation unit 22 when the job receiver side is required to correct the job attribute. For example, if a job transmitter side is a device capable of performing A3 print and the print ability of a job receiver side is limited to A4 and smaller sizes, it is required to change the sheet size.

If the job transmitter side is capable of performing two-sided print and the job receiver side cannot perform the two-sided print, it is required to change the print method. These attributes are mere examples and there may be another attributes that are required to be changed.

In FIG. 28, a sheet size selection field 2002 displays a candidate whose sheet size can be changed. A print method selection field 2003 indicates that the change from the two-sided print to the one-sided print is required. A back button 2004 is functionally similar to the button 1304 illustrated in FIG. 20. An OK button 2005 is functionally similar to the above-described button 1305.

Figure 29:
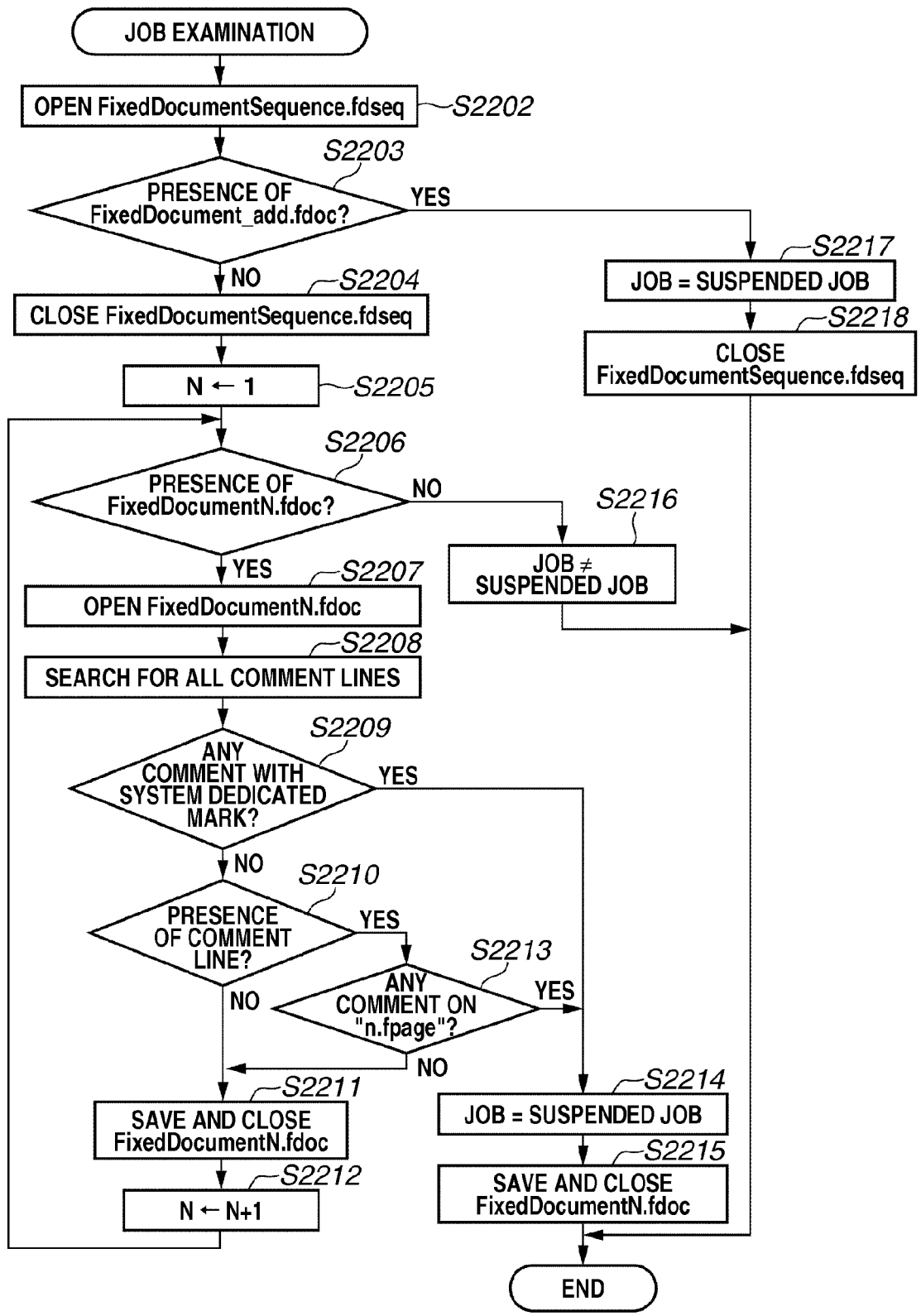
FIG. 29 is a flowchart illustrating an example procedure of data processing that can be performed by the image forming apparatus according to an exemplary embodiment.

FIG. 29 is a flowchart illustrating an example procedure of data processing that can be performed by the image forming apparatus according to an exemplary embodiment. The processing illustrated in FIG. 29 is processing performed by the job receiver side for identifying a suspended job when the job receiver side has functions according to the present exemplary embodiment. The CPU 12 executes the program corresponding to respective steps of FIG. 29, which may be loaded from the ROM 13 to the RAM 19. As another method, the program can be stored in the external memory 14 and can be loaded to the RAM 19.

If the job examination starts, then in step S2202, the CPU 12 opens the FixedDocumentSequence.fdseq. In step S2203, the CPU 12 determines whether the FixedDocumentSequence.fdseq includes a copy of FixedDocument.fdoc having a format of FixedDocument_add.fdoc. If the CPU 12 determines that the copy of FixedDocument.fdoc having the format of FixedDocument_add.fdoc is present, the CPU 12 can determine that the identified copy is an XPS text whose break-point was recorded according to the format illustrated in FIG. 14. Thus, the processing proceeds to step S2217. In step S2217, the CPU 12 determines that the received job is a suspended job. Then, the processing proceeds to step S2218. In step S2218, the CPU 12 closes the FixedDocumentSequence.fdseq and terminates the processing of this routine.

In the present exemplary embodiment, the character string "_add" existing in the file name of the FixedDocument.fdoc is usable for the above determination. Alternatively, according to another exemplary embodiment, any other character string may be used for the determination.

If in step S2203 the CPU 12 determines that the copy of FixedDocument.fdoc having the format of FixedDocument_add.fdoc is absent, the processing proceeds to step S2204 to continue the examination. In step S2204, the CPU 12 closes the FixedDocumentSequence.fdseq. Then, the processing proceeds to step S2205.

In step S2205, the CPU 12 initializes the parameter N to 1. The parameter N serves as the pointer that indicates each one of two or more pieces of FixedDocument.fdoc. In step S2206, if the parameter N is 1, the CPU 12 determines whether there is any FixedDocument.fdoc. If the CPU 12 determines that the FixedDocument.fdoc is present, the processing proceeds to step S2207. If in step S2206 the CPU 12 determines that there is not any FixedDocument.fdoc, the CPU 12 further determines whether there is any FixedDocument1.fdoc (although not illustrated).

If the CPU 12 determines that the FixedDocument1.fdoc is present, the processing proceeds to step S2207 (although not illustrated). If the CPU 12 determines that the FixedDocument1.fdoc is absent, the processing proceeds to step S2216. In step S2216, the CPU 12 determines that the received job is not a suspended job and terminates the processing of this routine. Hereinafter, the FixedDocument.fdoc and the FixedDocumentN.fdoc (N is an integer successively incremented from 1) are collectively referred to as "FixedDocumentN.fdoc."

In step S2207, the CPU 12 opens the FixedDocumentN.fdoc whose presence was confirmed in step S2206. In step S2208, the CPU 12 searches the opened FixedDocumentN.fdoc for any comment line added according to an exemplary embodiment.

In step S2209, the CPU 12 determines whether there is any comment added according to the present exemplary embodiment (more specifically, any comment with a mark indicating addition according to the present exemplary embodiment) based on the comment line search result. If the CPU 12 determines that there is not any marked comment, the processing proceeds to step S2210. If the CPU 12 determines that there is a marked comment, the processing proceeds to step S2214.

In step S2210, the CPU 12 determines whether there is a comment line. If the CPU 12 determines that there is no comment line, the processing proceeds to step S2211. If the CPU 12 determines that there is a comment line, the processing proceeds to step S2213.

This is because, at the time when the processing proceeds to step S2210, there are only two cases remaining. In one of these two cases, a comment added by the XPS text creator (e.g., a driver or an application) is included. In the other case, the mark indicating addition is absent although a comment is added according to the present exemplary embodiment.

In step S2213, the CPU 12 determines whether the comment comments on n.fpage. If the CPU 12 determines that there is a comment on n.fpage, it is the comment added according to the present exemplary embodiment (i.e., a comment added to disable the page link). In this case, the processing proceeds to step S2214.

If in step S2213 the CPU 12 determines that there is no comment on n.fpage, it can be determined that it is the comment added by the XPS text creator (e.g., a driver or an application) Thus, the processing proceeds to step S2211.

In step S2211, the CPU 12 saves and closes the comment checked FixedDocumentN.fdoc. In step S2212, the CPU 12 increments the parameter N by 1. The parameter N serves as the pointer that indicates each one of two or more FixedDocumentN.fdoc. Then, the processing returns to step S2206.

If in step S2209 the CPU 12 determines that a marked comment is present, or if in step S2213 the CPU 12 determines that there is a comment on n.fpage, then in step S2214, the CPU 12 determines that the received job is a suspended job. Then, the processing proceeds to step S2215. In step S2215, the CPU 12 saves and closes the FixedDocumentN.fdoc and terminates the processing of this routine.

In the processing of step S2214 (i.e., when the CPU 12 determines that the received job is a suspended job), the CPU 12 causes the operation unit 22 to display a user interface illustrated in FIG. 30 to enable users to select the continued print (that resumes from the breakpoint) or the full-item reprint (that restarts from the beginning).

FIG. 30 illustrates an example of a user interface that can be displayed by the image forming apparatus according to an exemplary embodiment.

In FIG. 30, a job reception screen 1901 is a screen that may be displayed when it is confirmed that a structured text includes an updated structure portion and when it is necessary to acquire a user's decision about an action to be taken for the suspended job. A button 1902 enables the user to instruct the continued print. If the button 1902 is selected and an OK button 1905 is pressed, the job including the updated structure portion is directly printed. A back button 1904 is functionally similar to the button 1304 illustrated in FIG. 20.

A button 1903 enables the user to instruct the full-item reprint. If the button 1903 is selected and the button 1905 is pressed, the CPU 12 starts the processing illustrated in FIG. 12. The CPU 12 converts a structured text having a structure similar to the FixedDocument.fdoc 901 structure or the FixedDocument.fdoc 902 structure illustrated in FIG. 10 into a structured text having a structure similar to the FixedDocument.fdoc 903 structure or the FixedDocument.fdoc 904 structure illustrated in FIG. 10. Then, the CPU 12 causes the print unit 17 to perform the print of all items.

If the button 1405 illustrated in FIG. 21 is selected or if the button 1505 illustrated in FIG. 22 is selected, a device that does not have any function according to the present exemplary embodiment may be selected as an output destination. In this case, an XPS text that conforms to the XPS grammar may be transferred together with a setting indicating that the print resumes from the breakpoint.

Through the above-described processing, the job receiver side can confirm a print ticket to automatically determine whether to switch to the full-item reprint and then acquire a user's decision about an action to be taken. Alternatively, the job receiver side can automatically select the continued print or the full-item print.

If the received print ticket includes any print attribute that is incompatible to the device ability, the job receiver side can automatically identify such an attribute and requests the user to convert the identified attribute into an optimum attribute.

Moreover, even if the print ticket to be switched to the full-item print is not included, the job receiver side can determine whether the received job is a suspended job. If the received job is a suspended job, the job receiver side can further determine whether to perform the continued print (that resumes from the breakpoint) or the full-item print (that restarts from the beginning).

An example of the configuration of a data processing program readable by the image forming apparatus according to the present invention is described with reference to a memory map illustrated in FIG. 31.

FIG. 31 illustrates a memory map of a storage medium that stores various data processing programs readable by the image forming apparatus according to the present invention.

Although not illustrated in the drawings, the storage medium can store management information for the programs stored in the storage medium, such as version information and creator name, as well as information relevant to the OS that reads the programs, e.g., icons discriminately displaying the programs.

Further, a directory of the above-described storage medium can manage data belonging to various programs. Moreover, the storage medium can store a program that may be used to install various programs on a computer and a decompression program if the installed program is compressed.

A host computer can execute program(s) installed from the outside to realize the functions indicated in FIGS. 6, 7, 11, 12, 16-19, 27, and 29 according to the present exemplary embodiment. In this case, the present invention may be applicable when an information group including the program is supplied from an external storage medium to an output apparatus using an appropriate storage medium (e.g., CD-ROM, flash memory, and FD) or via a network.

A storage medium storing a software program code for realizing the functions of the above-described exemplary embodiments can be supplied to a system or an apparatus. A computer (or CPU or micro-processing unit (i.e., MPU)) in the system or the apparatus can read the program code from the storage medium and execute the program code to realize the functions of the above-described exemplary embodiments.

In this case, the program code itself read out of the storage medium can realize novel functions of the present invention. The storage medium storing the program code constitutes the present invention.

Accordingly, equivalents of programs (e.g., object code, interpreter program, and OS script data) are usable if they possess comparable functions.

A storage medium supplying the program can be selected from any one of a floppy disk, a hard disk, an optical disk, a magneto-optical (i.e., MO) disk, a compact disc—ROM (i.e., CD-ROM), a CD-recordable (i.e., CD-R), a CD-rewritable (i.e., CD-RW), a magnetic tape, a nonvolatile memory card, a ROM, and a digital versatile disc (i.e., DVD (including a DVD-ROM and a DVD-R)).

In this case, the program code itself read out of the storage medium realizes the functions of the above-described exemplary embodiments. The storage medium storing the program code constitutes the present invention.

The method for supplying the program includes accessing a website on the Internet using the browsing function of a client computer, when the website allows each user to download the computer program of the present invention, or compressed files of the programs having automatic installing functions, to a hard disk or other recording medium of the user. Furthermore, the program code constituting the program of the present invention is dividable into a plurality of files so that respective files are downloadable from different websites. Namely, the present invention encompasses World Wide Web (i.e., WWW) servers and File Transfer Protocol (i.e., FTP) servers that allow numerous users to download the program files so that their computers can realize the functions or processes according to the present invention.

Moreover, enciphering the program according to the present invention and storing the enciphered program on a CD-ROM or comparable storage medium is an exemplary method when the program of the present invention is distributed to users. The authorized users (i.e., users satisfying predetermined conditions) are allowed to download key information from a website on the Internet. The users can decipher the program with the obtained key information and can install the program on their computers.

When the computer reads and executes the installed program, the computer can realize the functions of the above-described exemplary embodiments. Moreover, an operating system (i.e., OS) or other application software running on a computer can execute part or all of actual processing based on instructions of the programs to realize the functions of the above-described exemplary embodiments.

Additionally, the program code read out of a storage medium can be written into a memory of a function expansion board inserted in a computer or into a memory of a function expansion unit connected to the computer. In this case, based on instructions of the program, a CPU provided on the function expansion board or the function expansion unit can execute part or all of the processing to realize the functions of the above-described exemplary embodiments.

According to the exemplary embodiments of the present invention, the structure of a job whose print processing is suspended can be corrected to a state where the print can be instructed to resume from a breakpoint or restart from the beginning.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-121986 filed May 8, 2008, which is hereby incorporated by reference herein in its entirety.

What is claimed is:

1. An image forming apparatus comprising:
   a print unit configured to execute printing based on a structured document, said structured document including page entity information and a structure portion in which a link to the page entity information is set, and
   a correction unit configured to comment out a section in the structure portion corresponding to a page entity information that was successfully printed during execution of the printing in response to instructing to suspend the printing based on the structured document,
   wherein the print unit does not print the page entity information corresponding to the commented-out section, and prints page entity information corresponding to a section that is not commented out.

2. The image forming apparatus according to claim 1, wherein the correction unit uncomments the commented-out section in response to an instruction for a printing of all pages.

3. The image forming apparatus according to claim 1, further comprising:
   a designation unit configured to designate either one of a continued printing and a printing of all pages,
   wherein the print unit does not print the page entity information corresponding to the commented-out section and prints the page entity information corresponding to the section that is not commented out in a case where the designation unit designates the continued printing, and
   wherein the correction unit uncomments the commented-out section in response to the instruction for the printing of all pages, in the case where the designation unit designates the continued printing.

4. The image forming apparatus according to claim 1, further comprising
   a display unit configured to display information suggesting a printing of all pages in a case where printing is executed based on a structured document including a section that is commented out.

5. The image forming apparatus according to claim 4, wherein the display unit displays information suggesting the printing of all pages in a case where stapling is designated.

6. An image forming method comprising:
   printing based on a structured document, said structured document including page entity information and a structure portion in which a link to the page entity information is set; and
   correcting, by commenting out a section in the structure portion corresponding to a page entity information that was successfully printed during execution of the printing in response to instructing to suspend the printing based on the structured document,
   wherein the printing does not print the page entity information corresponding to the commented-out section, and prints page entity information corresponding to a section that is not commented out.

7. The image forming method according to claim 6, wherein the correcting step uncomments the commented-out section in response to an instruction for a printing of all pages.

8. The image forming method according to claim 6, further comprising:
   designating either one of a continued printing and a printing of all pages,
   wherein the printing does not print the page entity information corresponding to the commented-out section and prints the page entity information corresponding to the section that is not commented out in a case where it is designated to continue printing, and
   wherein the correcting step uncomments the commented-out section in response to the instruction for the printing of all pages, in the case where it is designated to continue printing.

9. The image forming method according to claim 6, further comprising
   displaying information suggesting a printing of all pages in a case where printing is executed based on a structured document including a section that is commented out.

10. The image forming method according to claim 9, wherein the displaying step displays information suggesting the printing of all pages in a case where stapling is designated.

11. A non-transitory computer readable storage medium storing a program capable of causing a computer to function as the respective units of the imaging apparatus according to claim 1.

* * * * *